(12) United States Patent
Lin et al.

(10) Patent No.: US 8,521,664 B1
(45) Date of Patent: *Aug. 27, 2013

(54) PREDICTIVE ANALYTICAL MODEL MATCHING

(75) Inventors: Wei-Hao Lin, New York, NY (US); Travis H. K. Green, New York, NY (US); Robert Kaplow, New York, NY (US); Gang Fu, Kearny, NJ (US); Gideon S. Mann, New York, NY (US)

(73) Assignee: Google Inc., Mountain View, CA (US)

( * ) Notice: Subject to any disclaimer, the term of this patent is extended or adjusted under 35 U.S.C. 154(b) by 124 days.

This patent is subject to a terminal disclaimer.

(21) Appl. No.: 13/172,714

(22) Filed: Jun. 29, 2011

Related U.S. Application Data

(63) Continuation-in-part of application No. 12/780,751, filed on May 14, 2010, now Pat. No. 8,438,122.

(51) Int. Cl.
*G06F 15/18* (2006.01)

(52) U.S. Cl.
USPC .......................................................... 706/12

(58) Field of Classification Search
None
See application file for complete search history.

(56) References Cited

U.S. PATENT DOCUMENTS

| | | | |
|---|---|---|---|
| 5,271,088 A | 12/1993 | Bahler | |
| 6,243,696 B1 | 6/2001 | Keeler et al. | |
| 6,778,959 B1 | 8/2004 | Wu et al. | |
| 6,879,971 B1 | 4/2005 | Keeler et al. | |
| 6,920,458 B1 | 7/2005 | Chu et al. | |
| 7,010,696 B1 | 3/2006 | Cambridge et al. | |
| 7,054,847 B2 | 5/2006 | Hartman et al. | |
| 7,194,395 B2 | 3/2007 | Genovese | |
| 7,349,919 B2 | 3/2008 | Russell et al. | |
| 7,565,304 B2 | 7/2009 | Casati et al. | |
| 7,590,589 B2 | 9/2009 | Hoffberg | |
| 7,606,924 B2 | 10/2009 | Raz et al. | |
| 7,650,331 B1 | 1/2010 | Dean et al. | |
| 7,668,740 B1 | 2/2010 | Baggett et al. | |
| 7,689,520 B2 | 3/2010 | Burges et al. | |
| 7,788,195 B1 | 8/2010 | Subramanian et al. | |
| 7,813,870 B2 | 10/2010 | Downs et al. | |

(Continued)

OTHER PUBLICATIONS

Duchi, John, et al., "Boosting with Structural Sparsity", 2009, cs.berkeley.edu [online]. [Retrieved on Nov. 25, 2011]. Retrieved from the Internet: <URL: http://www.cs.berkeley.edu/~jduchi/projects/DuchiSi09d.pdf>, 41 pages.

(Continued)

*Primary Examiner* — Michael B Holmes
(74) *Attorney, Agent, or Firm* — Fish & Richardson P.C.

(57) ABSTRACT

Methods, systems, and apparatus, for selecting a trained predictive models. A request is received from a client-subscriber computing system for access to a trained predictive model that can generate a predictive output in response to receiving input data having one or more input types. Information that describes each of the trained predictive models in a predictive model repository can be used to determine that one or more models included in the repository match the request. Determining a match can be based (at least in part) on a comparison of the one or more input types to input types included in the information that describes the trained predictive models. Access is provided to at least one of the models to the client-subscriber computing system. The models that match the request are models that were trained using training data provided by a computing system other than the client-subscriber computing system.

27 Claims, 7 Drawing Sheets

(56) References Cited

U.S. PATENT DOCUMENTS

| | | | |
|---|---|---|---|
| 7,813,944 | B1 | 10/2010 | Luk et al. |
| 7,899,611 | B2 | 3/2011 | Downs et al. |
| 7,912,628 | B2 | 3/2011 | Chapman et al. |
| 7,930,266 | B2 | 4/2011 | Tuv et al. |
| 7,933,762 | B2 | 4/2011 | Pinto et al. |
| 7,970,721 | B2 | 6/2011 | Leskovec et al. |
| 7,979,365 | B2 | 7/2011 | Goldberg et al. |
| 8,027,854 | B2 | 9/2011 | Baggett et al. |
| 8,065,073 | B2 | 11/2011 | Downs et al. |
| 8,065,659 | B1 | 11/2011 | Prince et al. |
| 8,090,524 | B2 | 1/2012 | Chapman et al. |
| 8,250,009 | B1* | 8/2012 | Breckenridge et al. .......... 706/14 |
| 8,311,967 | B1* | 11/2012 | Lin et al. ..................... 706/45 |
| 8,370,279 | B1* | 2/2013 | Lin et al. ..................... 706/12 |
| 8,438,122 | B1* | 5/2013 | Mann et al. ................... 706/12 |
| 2002/0099730 | A1 | 7/2002 | Brown et al. |
| 2003/0212851 | A1 | 11/2003 | Drescher et al. |
| 2005/0234753 | A1 | 10/2005 | Pinto et al. |
| 2006/0173906 | A1 | 8/2006 | Chu et al. |
| 2007/0150424 | A1 | 6/2007 | Igelnik |
| 2008/0097937 | A1 | 4/2008 | Hadjarian |
| 2008/0154821 | A1 | 6/2008 | Poulin |
| 2008/0270363 | A1 | 10/2008 | Hunt et al. |
| 2008/0288209 | A1 | 11/2008 | Hunt et al. |
| 2008/0288889 | A1 | 11/2008 | Hunt et al. |
| 2008/0294372 | A1 | 11/2008 | Hunt et al. |
| 2008/0294996 | A1 | 11/2008 | Hunt et al. |
| 2008/0319829 | A1 | 12/2008 | Hunt et al. |
| 2009/0006156 | A1 | 1/2009 | Hunt et al. |
| 2009/0018996 | A1 | 1/2009 | Hunt et al. |
| 2009/0106178 | A1 | 4/2009 | Chu |
| 2009/0157571 | A1 | 6/2009 | Smith et al. |
| 2010/0049538 | A1 | 2/2010 | Frazer et al. |
| 2010/0100826 | A1 | 4/2010 | Hawthorne et al. |
| 2011/0145175 | A1 | 6/2011 | Agarwal |
| 2011/0202487 | A1 | 8/2011 | Koshinaka |
| 2011/0289025 | A1 | 11/2011 | Yan et al. |
| 2011/0313900 | A1 | 12/2011 | Falkenborg et al. |

OTHER PUBLICATIONS

Duchi, John, et al., "Boosting with Structural Sparsity", Proceedings of the 26th International Conference on Machine Learning, Montreal, Canada, 2009, cs.berkeley.edu [online]. [Retrieved on Nov. 25, 2011]. Retrieved from the Internet: <URL: http://www.cs.berkeley.edu/~jduchi/projects/DuchiSi09a.pdf>, 8 pages.

Uclassify web pages, 16 pages, [online] [retrieved on May 18, 2010]. Retrieved from the Internet: <URL: http://www.uclassify.com/.

R-Project web pages, [online] [retrieved on May 18, 2010]. Retrieved from the Internet: <URL: http://www.r-project.org/>. 190 pages.

Zementis web pages, 34 pages [online] [retrieved on May 18, 2010]. Retrieved from the Internet: <URL: http://www.zementis.com/>, 34 pages.

"Google Prediction API (*Labs*)", Google.com, [Retrieved on May 4, 2011]. Retrieved from the Internet: <URL: http://code.google.com/apis/predict/>, 21 pages.

Weiss, Integrating Real-Time Predictive Analytics into SAP Applications [online], Dec. 30, 2009 [retrieved on Sep. 29, 2011], Retrieved from the Internet: ,URL:http://www.sdn.sap.com/irj/scn/go/portal/prtroot/docs/library/uuid/a07faefd-61d7-2c10-bba6-89ac5ffc302c?QuickLink=index&overridelayout=true>, 1 page.

Hutter, et al., "Performance Prediction and Automated Tuning of Randomized and Parametric Algorithms,", Principles and Practice of Constraint Programing, Lecture Notes in Computer Science, 2006, 15 pages.

SAS Rapid Predictive Modeler, Overview, 2010, 4 pages.

Postema, et al., "A Decision Support Tool for Tuning Parameters in a Machine Learning Algorithm", Nanyang Techonological University, 1997, 9 pages.

"Active learning (machine learning)," Wikipedia, the free encyclopedia, [online] [retrieved on Sep. 8, 2011]. Retrieved from the Internet: http://en.wikipedia.org/wiki/Active learning (machine learning), 3 pages.

Delany, et al., Generating Estimates of Classification Confidence for a Case-Based Spam Filter'; 2005; Springer-Vergal Berlin Heidelberg; Lecture Notes in Computer Science, 2005, vol. 3620, pp. 177-190.

Dag Consistent Parallel Simpulation: A Predictable and Robust Conservative Algorithm, Wenton Cai et al.; Parallel and Distributed Simulation, 1997; Proceedings, 11th Workshop on Digital Object Identifier; 10.1109/PADS.1997.594604; pp. 178-181.

Stochastic Models for the Web Graph, Kumar, R. et al.; Foundations of Computer Science, 2000; Proceedings, 41st Annual Symposium on Digital Object Identifier; 11.1109/SFCS.2000.892065; pp. 57-65.

Explicit Modeling of Mode Transition Constraints for Model Predictive Control, Kobayashi, K. et al.; SICE Annual Conference, 2008 Digital Object Identifier: 10.1109/SICE.2008.4654911; pp. 1569-1574.

Research on Prediction Technique of Network Situation Awareness, Wang, et al.; Cybernetics and Intelligent Systems, 2008 IEEE Conference on Digital Object Identifier: 10.1109/ICCIS.2008.4670783; pp. 570-574.

T. Dietterich, Ensemble Methods in Machine Learning:, J. Kittler and F. Foli (Eds.), MCS 2000, pp. 1-15.

Predictive Dynamix Inc., Predictive Modeling Technology, Predictive Dynamix, Inc., 2003-2004, 5 pages.

Duin, P.W. Robert, et al., Experiments with Classifier Combining Rules, J. Kittler and F. Foli (Eds.): MCS 2000, LNCS 1857, pp. 16-29, 14 pages.

Barbieri, Maddalena Maria, et al., Optimal Predictive Model Selection, The Annals of Statistics, 2004, vol. 32, No. 3, 29 pages.

Yuan, Zheng et al., Combining Linear Progression Models: When and How? Dec. 2004, 27 pages.

Evaluating Predictive Models, 36-350, Data Mining, Principles of Data Mining, Chapter 7; Berk chapter 2, Oct. 26 and 28, 2001, 22 pages.

PMML 4.0 General Structure of a PMML Document, [online] [Retrieved on May 1, 2011]. Retrieved from the Internet: <URL: dmg.org/v4-0-1/General Structure.html>, 9 pages.

Predictive Model Markup Language, [online] [Retrieved on May 1, 2011], Retrieved from the Internet: <URL:http://en.wikipedia.org/wiki/Predictive_Model_Markup_Language>, 7 pages.

Developer's Guide—Google Prediction, [online] [Retrieved on May 6, 2011], Retrieved from the Internet: ,URL: http:www.google.com/.../developer-guide.htm>, 7 pages.

Makhtar, Mokhairi, et al., "Predictive Model Representation and Comparison: Towards Data and Predictive Models Governance", Computational Intelligence (UKCI), 2010 UK Workshop: Sep. 8-10, 2010; 6 pages.

Netuitive Announces Amazon EC2 Integration for Hybrid Cloud Performance Management [online] [retrieved on Apr. 26, 2011], Retrieved from the Internet: <URL: marketwire.com/.../Netuitive-Announc...>, 2 pages.

Google Apps Script Overview [online] [retrieved on May 6, 2011], Retrieved from the Internet: <URL: code.google.com/.../guide.html>, 4 pages.

"Google Prediction API (Labs)", Google.com, [Retrieved on May 4, 2011]. Retrieved from the Internet: <URL: http://code.google.com/apis/predict/>, 1 page.

Creative Commons Attribution-Share Alike 3.0 Unported, Cross-validation (statistics)., May 28, 2011, retrieved from: http://en.wikipedia.org/w/index.php?title=Cross-validation_(statistics)&oldid=431307466; pp. 1-5.

Creative Commons Attribution-Share Alike 3.0 Unported, Winnow (algorithm)., May 29, 2011, retrieved from http://en.wikipedia.org/w/index.php?title=Winnow_(algorithm)&oldid=431561845, 2 pages.

Bengio, Yoshua, Continuous Optimization of Hyper-Parameters, C.P. 6128 Succ. Centre-Ville, Montreal, Quebec, Canada, H3C 3J7, Aug. 6, 2002, 7 pages.

Daelemans, Walter et al., Combined Optimization of Feature Selection and Algorithm Parameters in Machine Learning of Language, CNTS Language Technology Group, University of Antwerp, Universiteitsplein 1, B-2610 Antwerpen, Postdoctoral research of the Fund for Scientific Research, Flanders, Belgium, Nov. 24, 2003, 12 pages.

C.E. Rasmussen & C.K.I. Williams, Gaussian Processes for Machine Learning, Model Selection and Adaptation of Hyperparameters, Chapter 5, the MIT Press, 2006 Massachusetts Institute of Technology. [Retrieved from the Internet on Oct. 18, 2011]. Retrieved from the Internet: <URL: http://www.gaussianprocess.org/gpml/chapters/RW5.pdf, 24 pages.

R. Duin, "The Combining Classifer: To Train or Not to Train?", IEEE Pattern Recognition, 2002 Proceedings, 16 International Conference, pp. 765-770.

L. Denoyer et al., "Structured Multimedia Document Classification", ACM DocEng '03, Nov. 20-22, 2003, pp. 153-160.

J. Platt et a., "Large Margin DAGs for Multiclass Classification", in Advances in Neural Information Processing Systems, S.A. Solla et al., eds., MIT Press 2000, pp. 1-7.

Potrera, Cosmin Marian, et al.; DCFMS: "A chunk-based distributed file system for supporting multimedia communication", Computer Science and Information (FedCSIS), 2011 Federated Conference on Publication Year: 2011, pp. 737-741.

McDermott, et al.: "Generating models of mental retardation from data with machine learning"; Knowledge and Data Engineering Exchange Workshop, 1997. Proceedings Digital Object Identifier: 10,1109/KDEX.1997.629850 Publication Year: 1997, pp. 114-119.

English, et al.; "A grammatical approach to reducing the statistical sparsity of language models in natural domains", Acoustics, Speech, and Signal Processing, IEEE International Conference of ICASSO'86, vol. 11, Digital Object Identifier: 10.1109/CASSO.1986.1168955 Publication Year: 1986, pp. 1141-1144.

Altincay, et al.; Post-processing of Classifier Outputs in Multiple Classifier Systems:, 2002; Springer-Verlag Berlin Heidelberg; Lecture Notes in Computer Science, 2002, vol. 2364; pp. 159-168.

Altincay, et al.: "Why Does Output Normalization Create Problems in Multiple Classifier Systems?" 2002; IEEE; 16th International Conference on Pattern Recognition, Proceedings; vol. 2; pp. 775-778.

Stemmer, Georg et al.; "Comparison and Combination of Confidence Measures"; 2006; Springer-Vergal Berlin Heidelbreg; Lecture Notes in Computer Science 2006, Volum 2448; pp. 181-188.

Altincay, et al., "Undesirable Effects of Output Normalization in Multiple Classifier Systems", 2002; Elsevier Science B.V.; Pattern Recognition Letters 24 (2003); pp. 1163-1170.

International Search Report and Written Opinion for PCT Application No. PCT/US2012/035978 filed May 1, 2012, received Aug. 8, 2012. 14 pages.

U.S. Appl. No. 13/101,040, Wei-Hao Lin et al., Predictive Analytical Modeling Accuracy Assessment, filed May 4, 2011.

U.S. Appl. No. 13/277,052, Lin et al., Predictive Model Importation, filed Oct. 19, 2011.

U.S. Appl. No. 13/246,541, Wei-Hao Lin et al., Predictive Analytical Modeling for Databases, filed Sep. 27, 2011.

U.S. Appl. No. 13/246,410, Wei-Hao Lin et al., Predictive Analytical Model Selection, filed Sep. 27, 2011.

U.S. Appl. No. 13/223,067, Lin et al., Training Data Expansion, filed Aug. 31, 2011.

U.S. Appl. No. 13/101,048, Wei-Hao Lin et al., Predictive Analytical Modeling Data Selection, filed May 4, 2011.

U.S. Appl. No. 13/248,474, Wei-Hao Lin et al., Score Normalization, filed Sep. 29, 2011.

U.S. Appl. No. 13/250,394, Lin et al., Predictive Model Application Programming Interface, filed Sep. 30, 2011.

U.S. Appl. No. 13/252,063, Wei-Hao Lin et al., Combining Predictive Models in Predictive Analytical Modeling, filed Oct. 3, 2011.

U.S. Appl. No. 13/209,358, Wei-Hao Lin et al., Determining a Type of Predictive Model for Training Data, filed Aug. 12, 2011.

U.S. Appl. No. 13/159,882, Wei-Hao Lin et al., Predictive Model Caching, filed Jun. 14, 2011.

U.S. Appl. No. 13/246,596, Wei-Hao Lin et al., Hosting Predictive Models, filed Sep. 27, 2011.

U.S. Appl. No. 13/195,349, Wei-Hao Lin et al., Improving Predictive Modeling Accuracy, filed Aug. 1, 2011.

U.S. Appl. No. 13/179,204, Wei-Hao Lin et al., Generating Training Data for Predictive Models, filed Jul. 8, 2011.

U.S. Appl. No. 13/198,900, Wei-Hao Lin et al., Anomaly Detection, filed Aug. 5, 2011.

U.S. Appl. No. 13/272,178, Wei-Hao Lin et al., Confidence Scoring in Predictive Modeling, filed Oct. 12, 2011.

U.S. Appl. No. 13/218,623, Wei-Hao Lin et al., Multi-Label Modeling, filed Aug. 26, 2011.

U.S. Appl. No. 13/228,365, Lin et al., Suggesting Training Examples, filed Sep. 8, 2011.

U.S. Appl. No. 13/245,688, Lin et al., Suggesting Training Examples, filed Sep. 26, 2011.

U.S. Appl. No. 13/249,725, Wei-Hao Lin et al., Predictive Model Training on Large Datasets, filed Sep. 30, 2011.

U.S. Appl. No. 13/224,245, Robert Kaplow et al., Predictive Model Evaluation and Training Based on Utility, filed Sep. 1, 2011.

U.S. Appl. No. 12/780,751, Mann et al., Predictive Analytic Modeling Platform, filed May 14, 2010.

U.S. Appl. No. 12/782,689, Mann et al., Predictive Analytic Modeling Platform, filed May 18, 2010.

U.S. Appl. No. 13/014,252, Breckenridge et al., Dynamic Predictive Modeling Platform, filed Jan. 26, 2011.

U.S. Appl. No. 13/014,223, Breckenridge et al., Updateable Predictive Analytical Modeling, filed Jan. 26, 2011.

U.S. Appl. No. 13/245,564, Breckenridge et al., Updateable Predictive Analytical Modeling, filed Sep. 26, 2011.

U.S. Appl. No. 13/170,067, Breckenridge et al., Customized Predictive Analytical Model Training, filed Jun. 27, 2011.

U.S. Appl. No. 13/171,423, Breckenridge et al., Predictive Analytical Model Training, filed Jun. 28, 2011.

U.S. Appl. No. 13/246,299, Wei-Hao Lin, Predictive Analytical Model, filed Sep. 27, 2011.

* cited by examiner

PREDICTIVE ANALYTICAL MODEL MATCHING

CROSS REFERENCE TO RELATED APPLICATION

This application is a continuation-in-part of, and claims priority to, pending U.S. patent application Ser. No. 12/780,751, filed on May 14, 2010, entitled "Predictive Analytic Modeling Platform". The disclosure of the foregoing application is incorporated herein by reference in its entirety.

TECHNICAL FIELD

This specification relates to selecting a predictive model from a set of available predictive models.

BACKGROUND

Predictive analytics generally refers to techniques for extracting information from data to build a model that can predict an output from a given input. Predicting an output can include predicting future trends or behavior patterns, or performing sentiment analysis, to name a few examples. Various types of predictive models can be used to analyze data and generate predictive outputs. Typically, a predictive model is trained with training data that includes input data and output data that mirror the form of input data that will be entered into the predictive model and the desired predictive output, respectively. The amount of training data that may be required to train a predictive model can be large, e.g., in the order of gigabytes or terabytes. The number of different types of predictive models available is extensive, and different models behave differently depending on the type of input data. Additionally, a particular type of predictive model can be made to behave differently, for example, by adjusting the hyper-parameters or via feature induction or selection.

SUMMARY

In general, one aspect, the subject matter described in this specification can be embodied in methods which include receiving a request from a client-subscriber computing system for access to a trained predictive model from a repository of trained predictive models, which trained predictive model can generate a predictive output in response to receiving input data having one or more input types. The one or more input types can be determined from the request. Information that describes each of the trained predictive models in the predictive model repository can be used to determine that one or more models included in the repository match the request from the client-subscriber computing system. Determining a match is based at least in part on a comparison of the one or more input types determined from the request to input types included in the information that describes the trained predictive models. Access is provided to at least one of the one or more models to the client-subscriber computing system. The one or more models that match the request are models that were trained using training data provided by a computing system other than the client-subscriber computing system. Other embodiments of this aspect include corresponding systems, apparatus, and computer programs recorded on computer storage devices, each configured to perform the actions of the methods.

These and other embodiments can each optionally include one or more of the following features, alone or in combination. An output type can be determined for predictive output for the client-subscriber computing system. If the output type is included in the request, then determining the output type includes receiving the output type in the request. If the output type is not included in the request, then determining the output type includes determining from the information that describes each of the trained predictive models that one or more models included in the repository are compatible with the one or more input types determined from the request and that the one or more models can generate output of one or more output types. The output type is selected from the one or more output types. Selecting the output type from the one or more output types can include selecting the output type in response to input received from the client-subscriber computing system that identifies an output type to select. Selecting the output type from the one or more output types can include selecting the output type that is associated with a model from the one or more models that is best matched to the request.

Determining from the information that describes each of the trained predictive models that one or more models included in the predictive model repository match the request from the client-subscriber computing system can be further based on a comparison of the output type determined for the request to output types included in the information that describes the trained predictive models. A first model of the one or more models that are determined to match the request can be a model that requires less input types to generate a predictive output than a number of input types determined from the request.

Determining from the information that describes each of the trained predictive models that one or more models included in the predictive model repository match the request from the client-subscriber computing system can include determining that a first model that generates the output type determined for the request requires a first input type to generate a predictive output, which first input type is not included in the one or more input types determined from the request. An intermediate model included in the predictive model repository can be identified that can be used with at least some of the one or more input types determined from the request to generate a predictive output that is of the first input type. The one or more models determined to match the request from the client-subscriber computing system can includes a set of models, which set includes the first model and the intermediate model that together match the request.

The one or more input types can be indicated in the request or can be derived from one or more samples of input data included in the request. At least one of the one or more input types determined from the request can be included in a hierarchy of input types, wherein the at least one input type can be represented by incrementally broader input types by incrementing to higher levels in the hierarchy. Determining a match based at least in part on a comparison of the one or more input types determined from the request to input types included in the information that describes the trained predictive models can include incrementing to one or more higher levels in the hierarchy until an input type for a trained predictive model matches the at least one input type determined from the request as represented by incrementally broader input types.

Particular embodiments of the subject matter described in this specification can be implemented so as to realize one or more of the following advantages. A client-subscriber computing system can receive access to a trained predictive model, or a set of trained predictive models, that can be used to generate predictive output in response to input provided by the client-subscriber computing system. An appropriate trained predictive model (or set) can be automatically selected for the client-subscriber computing system in response to receiving a request from the client-subscriber for access to a model. The client-subscriber computing system does not need to provide any training data to train a model, but rather receives access to a pre-trained predictive model. The client-subscriber computing system does not have to identify a particular type of output, but rather can selected one or more available output types based on the type of input data the client-subscriber will provide and the available pre-trained models.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Methods and systems are described that select one or more trained predictive model from a set of trained predictive models in response to a request for access to a trained predictive model. The request for access to a trained predictive model that can be used to generate predictive output in response to receiving input can include one or more samples of input data or a schematic representation of input data. The one or more trained predictive models can be selected, at least in part, based on compatibility with a type of input data that corresponds to the input data included or described in the request. An entity making the request for access to the trained predictive model can be an entity that did not provide any training data to train a predictive model, and can be provided access to a model was trained using training data obtained from a third-party source. The entity, once matched to an appropriate trained predictive model, can provide predictive requests that include input data to the trained predictive model and receive predictive outputs in response.

Figure 1:
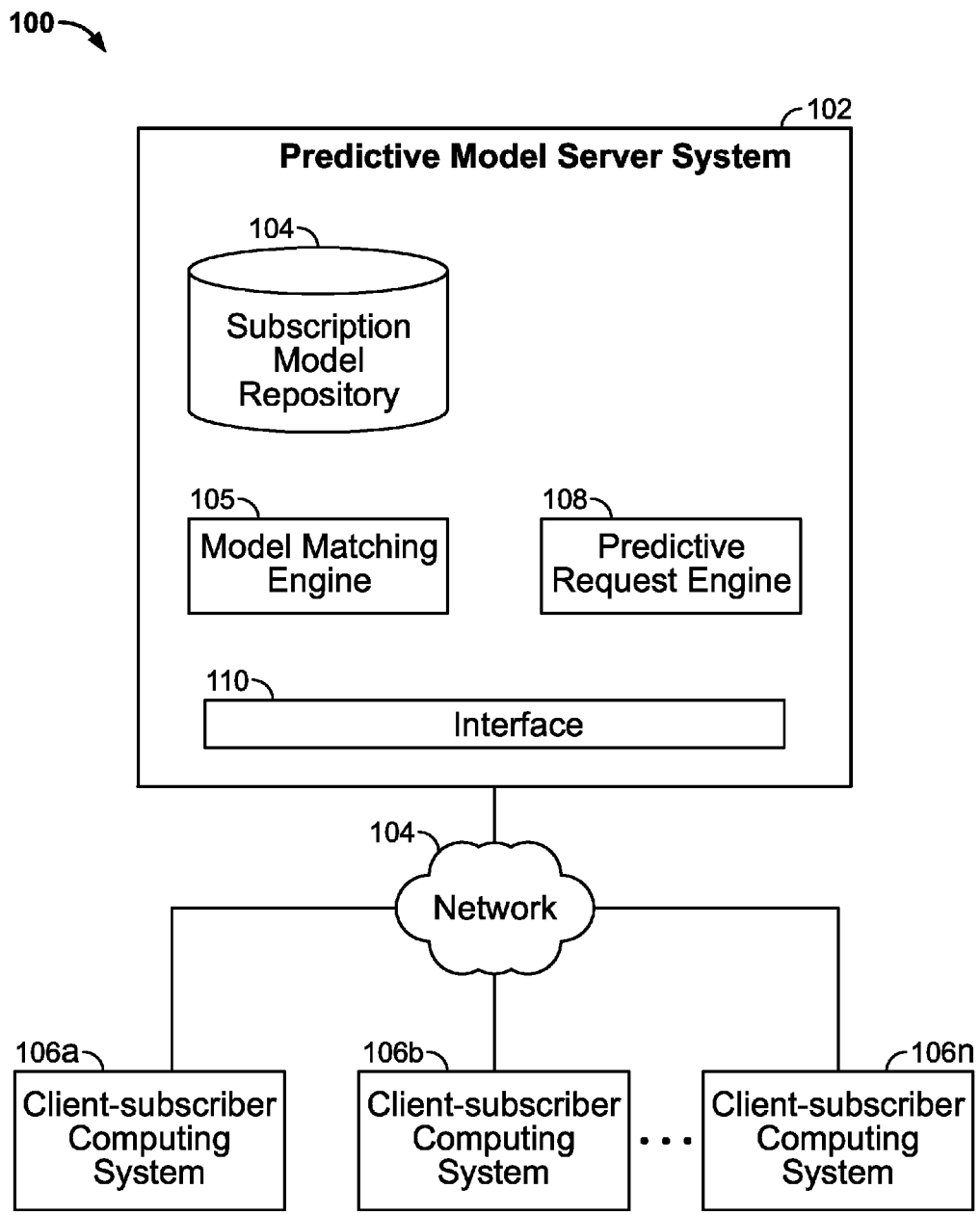
FIG. 1 is a schematic representation of an example system that matches a request to a trained predictive model.

FIG. 1 is a schematic representation of an example system 100 that matches a request for a trained predictive model to a suitable trained predictive model. In the example system 100, the entity that is requesting access to one or more trained predictive models is a client-subscriber computing system, e.g., client-subscriber computing system 106a, b . . . n (where n is an integer equal to or greater than 1). The request is submitted over a network 104 to a predictive model server system 102. The network 102 can include one or more local area networks (LANs), a wide area network (WAN), such as the Internet, a wireless network, such as a cellular network, or a combination of all of the above. The one or more trained predictive models that are selected in response to the request are obtained from a subscription model repository 104. A model matching engine 105 is configured to select the one or more trained predictive models by matching information included with the request to information about the trained predictive models included in the subscription model repository 104. In this particular example, the client-subscriber can subscribe to use one or more of the trained predictive models included in the subscription model repository 104, for example, in exchange for consideration that may include a subscription fee. The client-subscriber computing systems 106a-n can communicate with the predictive model server system 102 through an interface 110. The predictive request engine 108 is configured to receive a predictive request from a client-subscriber computing system and to provide a predictive response that is generated by the one or more trained predictive models that have been subscribed to by the client-subscriber computing system. Techniques for matching a client-subscriber computing system to one or more trained predictive models are described further below.

FIGS. 2-6 below describe example systems and methods that can be implemented to generate a repository of trained predictive models that can then be accessed by one or more client-subscriber computing systems, such as those shown in FIG. 1. That is, the systems and methods discussed below describe example implementations for generating the subscription model repository 104 shown in FIG. 1, although it should be understood that in other implementations, different methods and/or systems can be used to populate the subscription model repository 104 and those described herein are non-limiting examples.

Methods and systems are described that provide a dynamic repository of trained predictive models, at least some of which can be updated as new training data becomes available. A trained predictive model from the dynamic repository can be provided and used to generate a predictive output for a given input. For example, as a particular client entity's training data changes over time, a trained predictive model that was trained using the client entity's training data can be retrained with training data reflective of such changes. A client-subscriber to the trained predictive model can be provided access to the retrained predictive model, once available. As such, the repository of trained predictive models from which a predictive model can be selected to use to generate a predictive output is "dynamic", as compared to a repository of trained predictive models that are not updateable with new training data and are therefore "static".

Figure 2:
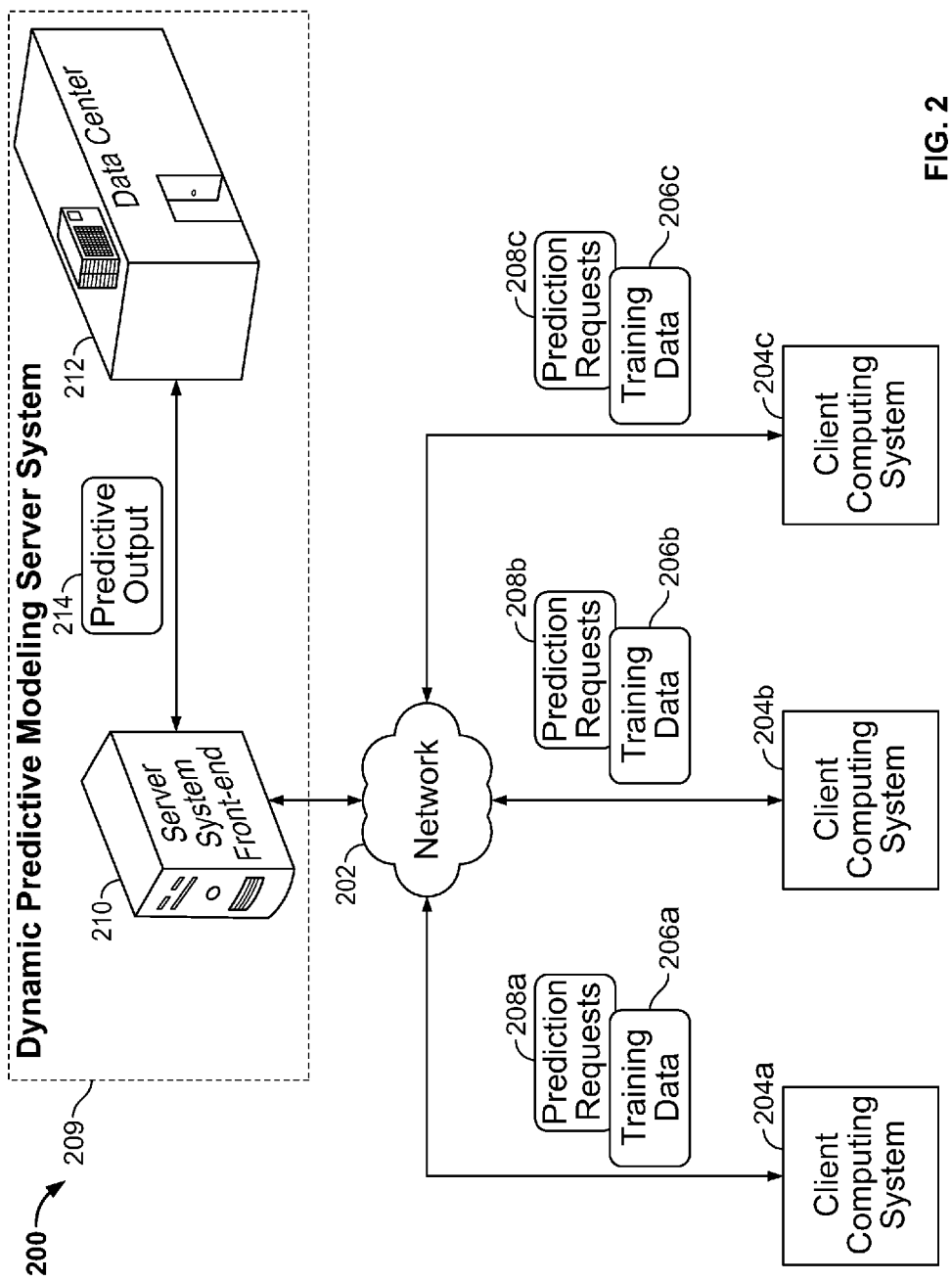
FIG. 2 is a schematic representation of an example system that provides a predictive analytic platform.

FIG. 2 is a schematic representation of an example system that provides a predictive analytic platform. The system 200 includes multiple client computing systems 204a-c that can communicate with a predictive modeling server system 209. In the example shown, the client computing systems 204a-c can communicate with a server system front end 210 by way of a network 202. The network 202 can include one or more local area networks (LANs), a wide area network (WAN), such as the Internet, a wireless network, such as a cellular network, or a combination of all of the above. The server system front end 210 is in communication with, or is included within, one or more data centers, represented by the data center 212. A data center 212 generally is a large numbers of computers, housed in one or more buildings, that are typically capable of managing large volumes of data.

A client entity—an individual or a group of people or a company, for example—may desire a trained predictive model that has been trained with the client entity's training data and that can receive input data from a client computing system 204a belonging to or under the control of the client entity and generate a predictive output. To train a particular predictive model can require a significant volume of training data, for example, one or more gigabytes of data. The client computing system 204a may be unable to efficiently manage such a large volume of data. Further, selecting and tuning an effective predictive model from the variety of available types of models can require skill and expertise that an operator of the client computing system 204a may not possess.

The system 200 described here allows training data 206a to be uploaded from the client computing system 204a to the predictive modeling server system 209 over the network 202. The training data 206a can include initial training data, which may be a relatively large volume of training data the client entity has accumulated, for example, if the client entity is a first-time user of the system 200. The training data 206a can also include new training data that can be uploaded from the client computing system 204a as additional training data becomes available. The client computing system 204a may upload new training data whenever the new training data becomes available on an ad hoc basis, periodically in batches, in a batch once a certain volume has accumulated, or otherwise.

The server system front end 210 can receive, store and manage large volumes of data using the data center 212. One or more computers in the data center 212 can run software that uses the training data to estimate the effectiveness of multiple types of predictive models and make a selection of a trained predictive model to be used for data received from the particular client computing system 204a. The selected model can be trained and the trained model made available to users who have access to the predictive modeling server system 209 and, optionally, users (e.g., client-subscriber computing systems) who have permission from the client entity that provided the training data for the model. Access and permission can be controlled using any conventional techniques for user authorization and authentication and for access control, if restricting access to the model is desired. The client computing system 204a can transmit prediction requests 208a over the network. The selected trained model executing in the data center 212 receives the prediction request, input data and request for a predictive output, and generates the predictive output 214. The predictive output 214 can be provided to the client computing system 204a, for example, over the network 202.

Advantageously, when handling large volumes of training data and/or input data, the processes can be scaled across multiple computers at the data center 212. The predictive modeling server system 209 can automatically provision and allocate the required resources, using one or more computers as required. An operator of the client computing system 204a is not required to have any special skill or knowledge about predictive models. The training and selection of a predictive model can occur "in the cloud", i.e., over the network 202, thereby lessening the burden on the client computing system's processor capabilities and data storage, and also reducing the required client-side human resources.

The term client computing system is used in this description to refer to one or more computers, which may be at one or more physical locations, that can access the predictive modeling server system. The data center 212 is capable of handling large volumes of data, e.g., on the scale of terabytes or larger, and as such can serve multiple client computing systems. For illustrative purposes, three client computing systems 204a-c are shown, however, scores of client computing systems can be served by such a predictive modeling server system 209.

Figure 3:
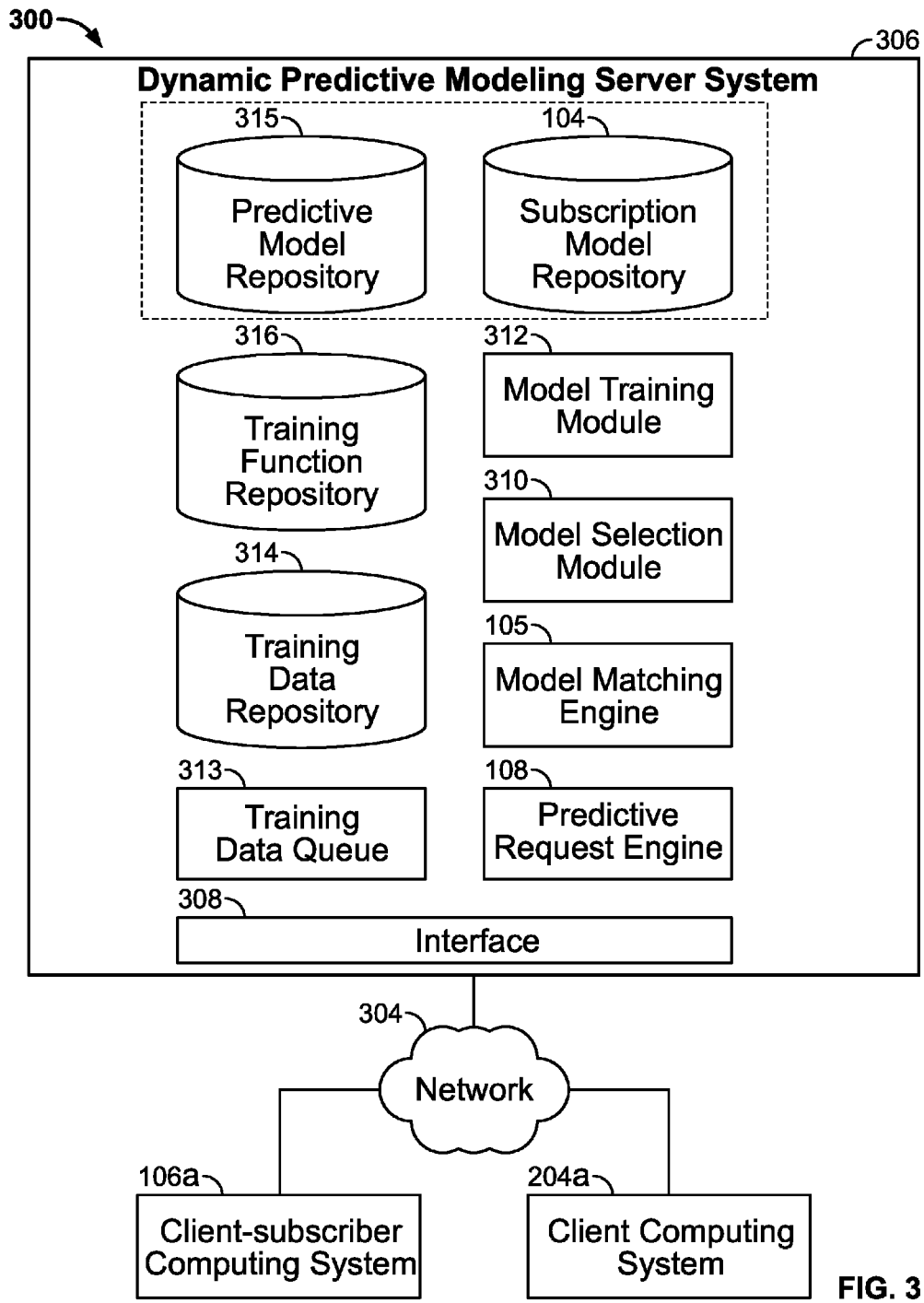
FIG. 3 is a schematic block diagram showing an example system for providing a predictive analytic platform over a network.

FIG. 3 is a schematic block diagram showing an example system 300 for providing a dynamic predictive analytic platform over a network. The example predictive model server system 102 shown in FIG. 1, in some implementations, can be implemented within the dynamic predictive modeling server system 306 shown in FIG. 3. As shown in this example system, the dynamic predictive modeling server system 306 can include the subscription model repository 104, modeling matching engine 105 and predictive request engine 108 shown in the predictive model server system 102 of FIG. 1.

For illustrative purposes, the system 300 is shown with one client-subscriber computing system 106a and one client computing system 204a communicating over a network 304 with the dynamic predictive modeling server system 306. The client computing system 204a is a computing system that uploads training data to the dynamic predictive modeling server system 306 to train one or more predictive models, and can be one of the client computing systems 204a-c, in this case 204a, described in reference to FIG. 2. The client-subscriber computing system 106a is a computing system that does not provide training data to train a predictive model, however, requests access to a trained predictive model to generate predictive outputs. It should be understood that the dynamic predictive modeling server system 306, which can be implemented using multiple computers that can be located in one or more physical locations, can serve multiple client-subscriber computing systems and multiple client computing systems, even though just one of each is shown for illustrative purposes.

In the example shown, the dynamic predictive modeling server system includes an interface 308. In some implementations the interface 308 can be implemented as one or more modules adapted to interface with components included in the predictive modeling server system 306 and the network 304, for example, the training data queue 313, the training data repository 314, the model selection module 310, the model matching engine 105, the predictive request engine 108, the subscription model repository 104 and/or the predictive trained model repository 315.

Figure 4:
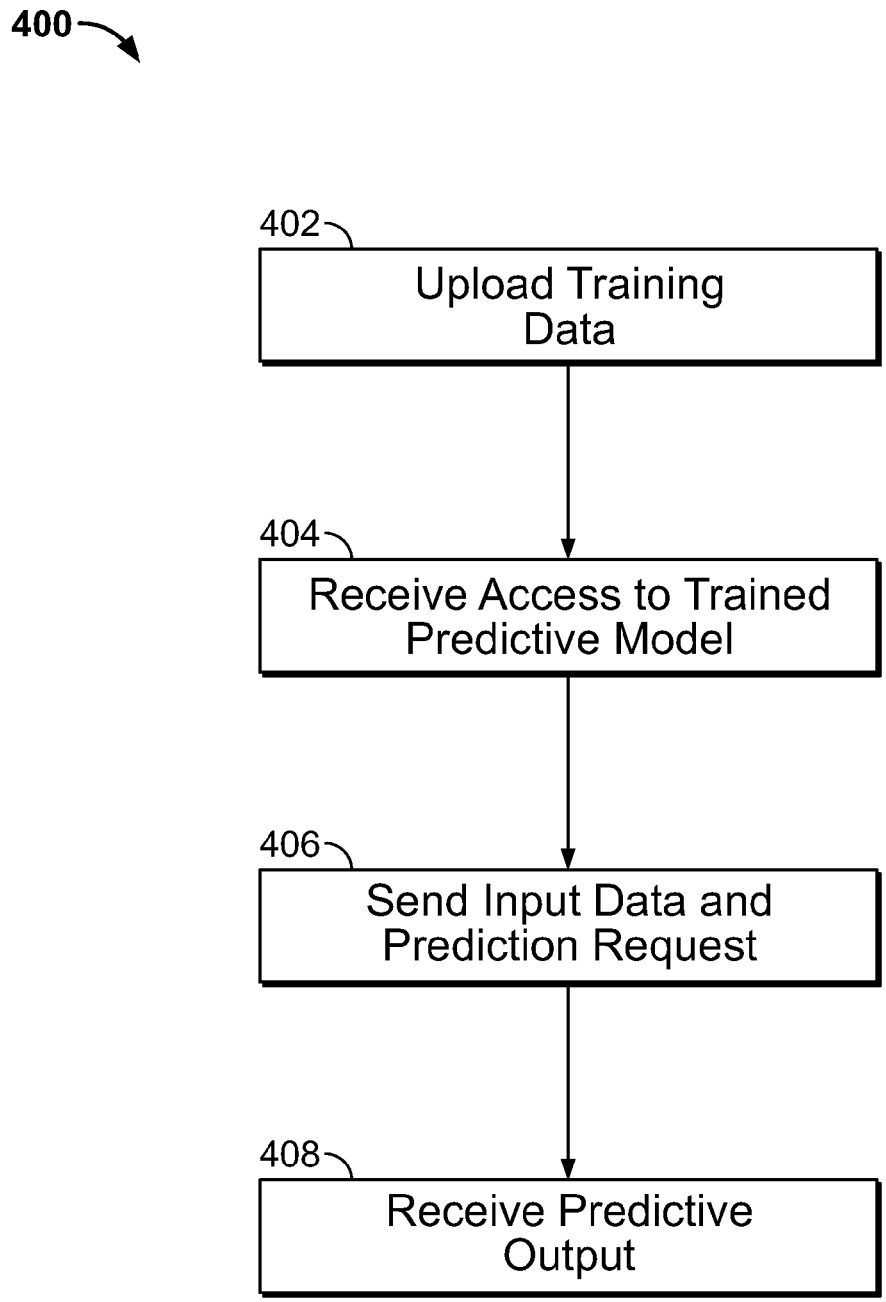
FIG. 4 is a flowchart showing an example process for using the predictive analytic platform from the perspective of the client computing system.

FIG. 4 is a flowchart showing an example process 400 for using the predictive analytic platform from the perspective of the client computing system 204a. The process 400 would be carried out by the client computing system 204a when the corresponding client entity is uploading the initial training data to the system 306. The client computing system 204a uploads training data (i.e., the initial training data) to the predictive modeling server system 306 over the network 304 (Step 402). In some implementations, the initial training data is uploaded in bulk (e.g., a batch) by the client computing system 204a. In other implementations, the initial training data is uploaded incrementally (e.g., streamed) by the client computing system 204a until a threshold volume of data has been received that together forms the "initial training data". The size of the threshold volume can be set by the system 306, the client computing system 204a or otherwise determined. In response, the client computing system 204a receives access to a trained predictive model that is stored in the predictive model repository 315 (Step 404).

In the implementations shown, the trained predictive model is not itself provided, but resides and executes at a location remote from the client computing system 204a. For example, referring back to FIG. 2, the trained predictive model can reside and execute in the data center 212, thereby not using the resources of the client computing system 204a. Once the client computing system 204a has access to the trained predictive model, the client computing system can send input data and a prediction request to the trained predictive model (Step 406). In response, the client computing system receives a predictive output generated by the trained predictive model from the input data (Step 408).

From the perspective of the client computing system 204a, training and using a predictive model is relatively simple. The training and selection of the predictive model, tuning of the hyper-parameters and features used by the model (to be described below) and execution of the trained predictive model to generate predictive outputs can be done remote from the client computing system 204a without expending client computing system resources. The amount of training data provided can be relatively large, e.g., gigabytes or more, which is often an unwieldy volume of data for a client entity.

Figure 5:
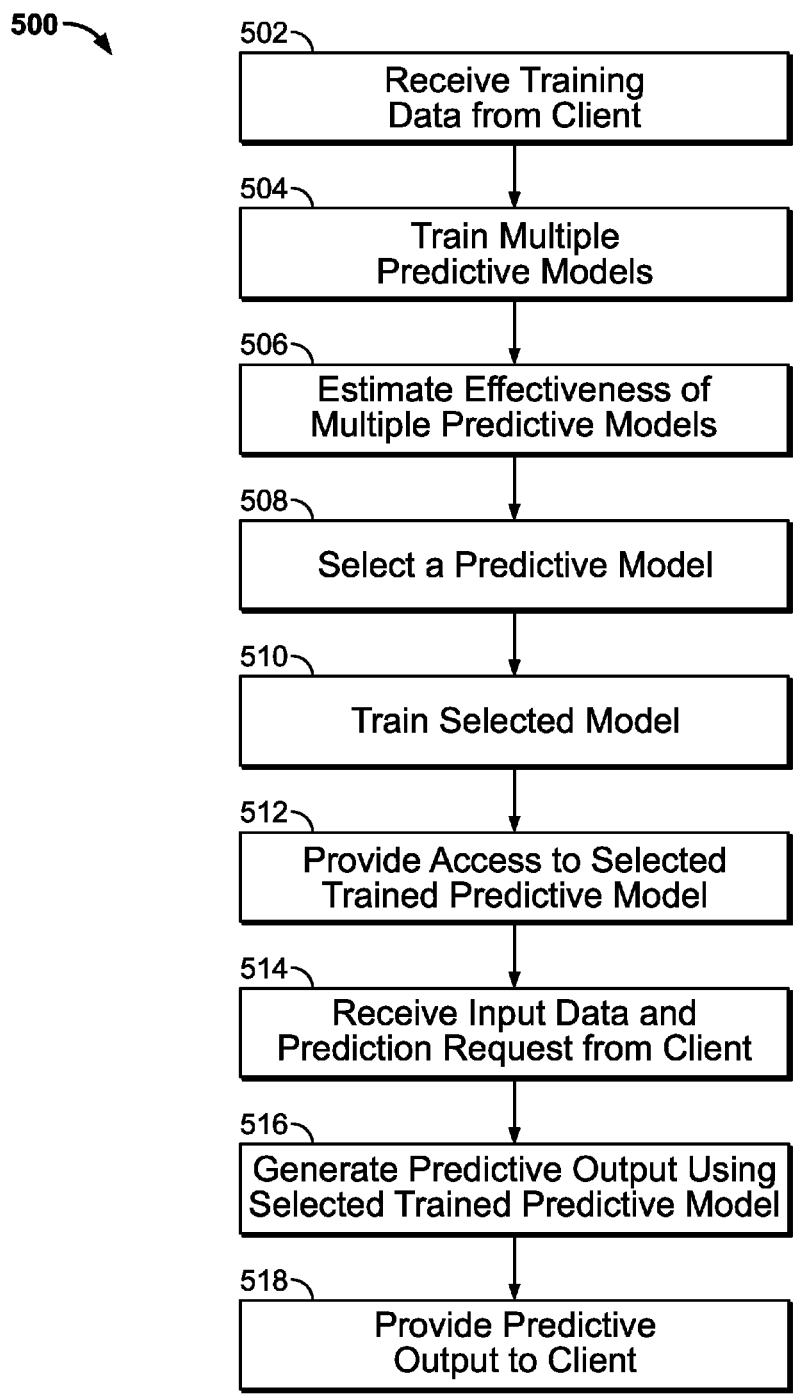
FIG. 5 is a flowchart showing an example process for serving a client computing system using the predictive analytic platform.

The predictive modeling server system 306 will now be described in more detail with reference to the flowchart shown in FIG. 5. FIG. 5 is a flowchart showing an example process 500 for serving a client computing system using the predictive analytic platform. The process 500 is carried out to provide access to a selected trained predictive model to the client computing system, which trained predictive model has been trained using initial training data.

Referring to FIG. 5, training data (i.e., initial training data) is received from the client computing system (Step 502). For example, the client computing system 204a can upload the training data to the predictive modeling server system 306 over the network 304 either incrementally or in bulk (i.e., as batch). As described above, if the initial training data is uploaded incrementally, the training data can accumulate until a threshold volume is received before training of predictive models is initiated. The training data can be in a convenient form that is understood by the modeling server system 306 to define a set of records, where each record includes an input and a corresponding desired output. By way of example, the training data can be provided using a comma-separated value format, or a sparse vector format. In another example, the client computing system 204a can specify a protocol buffer definition and upload training data that complies with the specified definition.

The process 500 and system 300 can be used in various different applications. Some examples include (without limitation) making predictions relating to customer sentiment, transaction risk, species identification, message routing, diagnostics, churn prediction, legal docket classification, suspicious activity, work roster assignment, inappropriate content, product recommendation, political bias, uplift marketing, e-mail filtering and career counseling. For illustrative purposes, the process 500 and system 300 will be described using an example that is typical of how predictive analytics are often used. In this example, the client computing system 204a provides a web-based online shopping service. The training data includes multiple records, where each record provides the online shopping transaction history for a particular customer. The record for a customer includes the dates the customer made a purchase and identifies the item or items purchased on each date. The client computing system 204a is interested in predicting a next purchase of a customer based on the customer's online shopping transaction history.

Various techniques can be used to upload a training request and the training data from the client computing system 204a to the predictive modeling server system 306. In some implementations, the training data is uploaded using an HTTP web service. The client computing system 204a can access storage objects using a RESTful API to upload and to store their training data on the predictive modeling server system 306. In other implementations, the training data is uploaded using a hosted execution platform, e.g., AppEngine available from Google Inc. of Mountain View, Calif. The predictive modeling server system 306 can provide utility software that can be used by the client computing system 204a to upload the data. In some implementations, the predictive modeling server system 306 can be made accessible from many platforms, including platforms affiliated with the predictive modeling server system 306, e.g., for a system affiliated with Google, the platform could be a Google App Engine or Apps Script (e.g., from Google Spreadsheet), and platforms entirely independent of the predictive modeling server system 306, e.g., a desktop application. The training data can be large, e.g., many gigabytes. The predictive modeling server system 306 can include a data store, e.g., the training data repository 314, operable to store the received training data.

The predictive modeling server system 306 includes a repository of training functions for various predictive models, which in the example shown are included in the training function repository 316. At least some of the training functions included in the repository 316 can be used to train an "updateable" predictive model. An updateable predictive model refers to a trained predictive model that was trained using a first set of training data (e.g., initial training data) and that can be used together with a new set of training data and a training function to generate a "retrained" predictive model. The retrained predictive model is effectively the initial trained predictive model updated with the new training data. One or more of the training functions included in the repository 316 can be used to train "static" predictive models. A static predictive model refers to a predictive model that is trained with a batch of training data (e.g., initial training data) and is not updateable with incremental new training data. If new training data has become available, a new static predictive model can be trained using the batch of new training data, either alone or merged with an older set of training data (e.g., the initial training data) and an appropriate training function.

Some examples of training functions that can be used to train a static predictive model include (without limitation): regression (e.g., linear regression, logistic regression), classification and regression tree, multivariate adaptive regression spline and other machine learning training functions (e.g., Naïve Bayes, k-nearest neighbors, Support Vector Machines, Perceptron). Some examples of training functions that can be used to train an updateable predictive model include (without limitation) Online Bayes, Rewritten Winnow, Support Vector Machine (SVM) Analogue, Maximum Entropy (MaxEnt) Analogue, Gradient based (FOBOS) and AdaBoost with Mixed Norm Regularization. The training function repository 316 can include one or more of these example training functions.

Referring again to FIG. 5, multiple predictive models, which can be all or a subset of the available predictive models, are trained using some or all of the training data (Step 504). In the example predictive modeling server system 306, a model training module 312 is operable to train the multiple predictive models. The multiple predictive models include one or more updateable predictive models and can include one or more static predictive models.

The client computing system 204a can send a training request to the predictive modeling server system 306 to initiate the training of a model. For example, a GET or a POST request could be used to make a training request to a URL. A training function is applied to the training data to generate a set of parameters. These parameters form the trained predictive model. For example, to train (or estimate) a Naïve Bayes model, the method of maximum likelihood can be used. A given type of predictive model can have more than one training function. For example, if the type of predictive model is a linear regression model, more than one different training function for a linear regression model can be used with the same training data to generate more than one trained predictive model.

For a given training function, multiple different hyper-parameter configurations can be applied to the training function, again generating multiple different trained predictive models. Therefore, in the present example, where the type of predictive model is a linear regression model, changes to an L1 penalty generate different sets of parameters. Additionally, a predictive model can be trained with different features, again generating different trained models. The selection of features, i.e., feature induction, can occur during multiple iterations of computing the training function over the training data. For example, feature conjunction can be estimated in a forward stepwise fashion in a parallel distributed way enabled by the computing capacity of the predictive modeling server system, i.e., the data center.

Considering the many different types of predictive models that are available, and that each type of predictive model may have multiple training functions and that multiple hyper-parameter configurations and selected features may be used for each of the multiple training functions, there are many different trained predictive models that can be generated. Depending on the nature of the input data to be used by the trained predictive model to predict an output, different trained predictive models perform differently. That is, some can be more effective than others.

The effectiveness of each of the trained predictive models is estimated (Step 506). For example, a model selection module 310 is operable to estimate the effectiveness of each trained predictive model. In some implementations, cross-validation is used to estimate the effectiveness of each trained predictive model. In a particular example, a 10-fold cross-validation technique is used. Cross-validation is a technique where the training data is partitioned into sub-samples. A number of the sub-samples are used to train an untrained predictive model, and a number of the sub-samples (usually one) is used to test the trained predictive model. Multiple rounds of cross-validation can be performed using different sub-samples for the training sample and for the test sample. K-fold cross-validation refers to portioning the training data into K sub-samples. One of the sub-samples is retained as the test sample, and the remaining K-1 sub-samples are used as the training sample. K rounds of cross-validation are performed, using a different one of the sub-samples as the test sample for each round. The results from the K rounds can then be averaged, or otherwise combined, to produce a cross-validation score. 10-fold cross-validation is commonly used.

In some implementations, the effectiveness of each trained predictive model is estimated by performing cross-validation to generate a cross-validation score that is indicative of the accuracy of the trained predictive model, i.e., the number of exact matches of output data predicted by the trained model when compared to the output data included in the test sub-sample. In other implementations, one or more different metrics can be used to estimate the effectiveness of the trained model. For example, cross-validation results can be used to indicate whether the trained predictive model generated more false positive results than true positives and ignores any false negatives.

In other implementations, techniques other than, or in addition to, cross-validation can be used to estimate the effectiveness. In one example, the resource usage costs for using the trained model can be estimated and can be used as a factor to estimate the effectiveness of the trained model.

In some implementations, the predictive modeling server system 306 operates independently from the client computing system 204a and selects and provides the trained predictive model to the client computing system 204a as a specialized service. The expenditure of both computing resources and human resources and expertise to select the training functions to include in the training function repository 316, the training functions to use for the various types of available predictive models, the hyper-parameter configurations to apply to the training functions and the feature-inductors all occur server-side. Once these selections have been completed, the training and model selection can occur in an automated fashion with little or no human intervention, unless changes to the server system 306 are desired. The client computing system 204a thereby benefits from access to a trained predictive model that otherwise might not have been available to the client computing system 204a, due to limitations on client-side resources.

Referring again to FIG. 5, each trained model is assigned a score that represents the effectiveness of the trained model. As discussed above, the criteria used to estimate effectiveness can vary. In the example implementation described, the criterion is the accuracy of the trained model and is estimated using a cross-validation score. Based on the scores, a trained predictive model is selected (Step 508). In some implementations, the trained models are ranked based on the value of their respective scores, and the top ranking trained model is chosen as the selected predictive model. Although the selected predictive model was trained during the evaluation stage described above, training at that stage may have involved only a sample of the training data, or not all of the training data at one time. For example, if k-fold cross-validation was used to estimate the effectiveness of the trained model, then the model was not trained with all of the training data at one time, but rather only K-1 partitions of the training data. Accordingly, if necessary, the selected predictive model is fully trained using the training data (e.g., all K partitions) (Step 510), for example, by the model training module 312. A trained model (i.e., "fully trained" model) is thereby generated for use in generating predictive output for the client computing system 204a. The trained predictive model can be stored by the predictive modeling server system 306, e.g., the trained predictive model can reside and execute in a data center that is remote from the client computing system 204a.

Of the multiple trained predictive models that were trained as described above, some or all of them can be stored in the predictive model repository 315. Each trained predictive model can be associated with its respective effectiveness score. One or more of the trained predictive models in the repository 315 are updateable predictive models. In some implementations, the predictive models stored in the repository 315 are trained using the entire initial training data, i.e., all K partitions and not just K-1 partitions. In other implementations, the trained predictive models that were generated in the evaluation phase using K-1 partitions are stored in the repository 315, so as to avoid expending additional resources to recompute the trained predictive models using all K partitions.

Access to the trained predictive model is provided (Step 512) rather than the trained predictive model itself. In some implementations, providing access to the trained predictive model includes providing an address to the client computing system 204a or other user computing platform that can be used to access the trained model; for example, the address can be a URL (Universal Resource Locator). Access to the trained predictive model can be limited to authorized users. For example, a user may be required to enter a user name and password that has been associated with an authorized user before the user can access the trained predictive model from a computing system, including the client computing system 204a. If the client computing system 204a desires to access the trained predictive model to receive a predictive output, the client computing system 204a can transmit to the URL a request that includes the input data. The predictive modeling server system 306 receives the input data and prediction request from the client computing system 204a (Step 514). In response, the input data is input to the trained predictive model and a predictive output generated by the trained model (Step 516). The predictive output is provided; it can be provided to the client computing system (Step 518). In some implementations, the predictive request engine 108 can be configured to receive the input data and prediction request, input same to the selected trained predictive model (e.g., obtained from the predictive model repository 315) and to provide the predictive output generated in response to the client computing system 204a.

Figure 6:
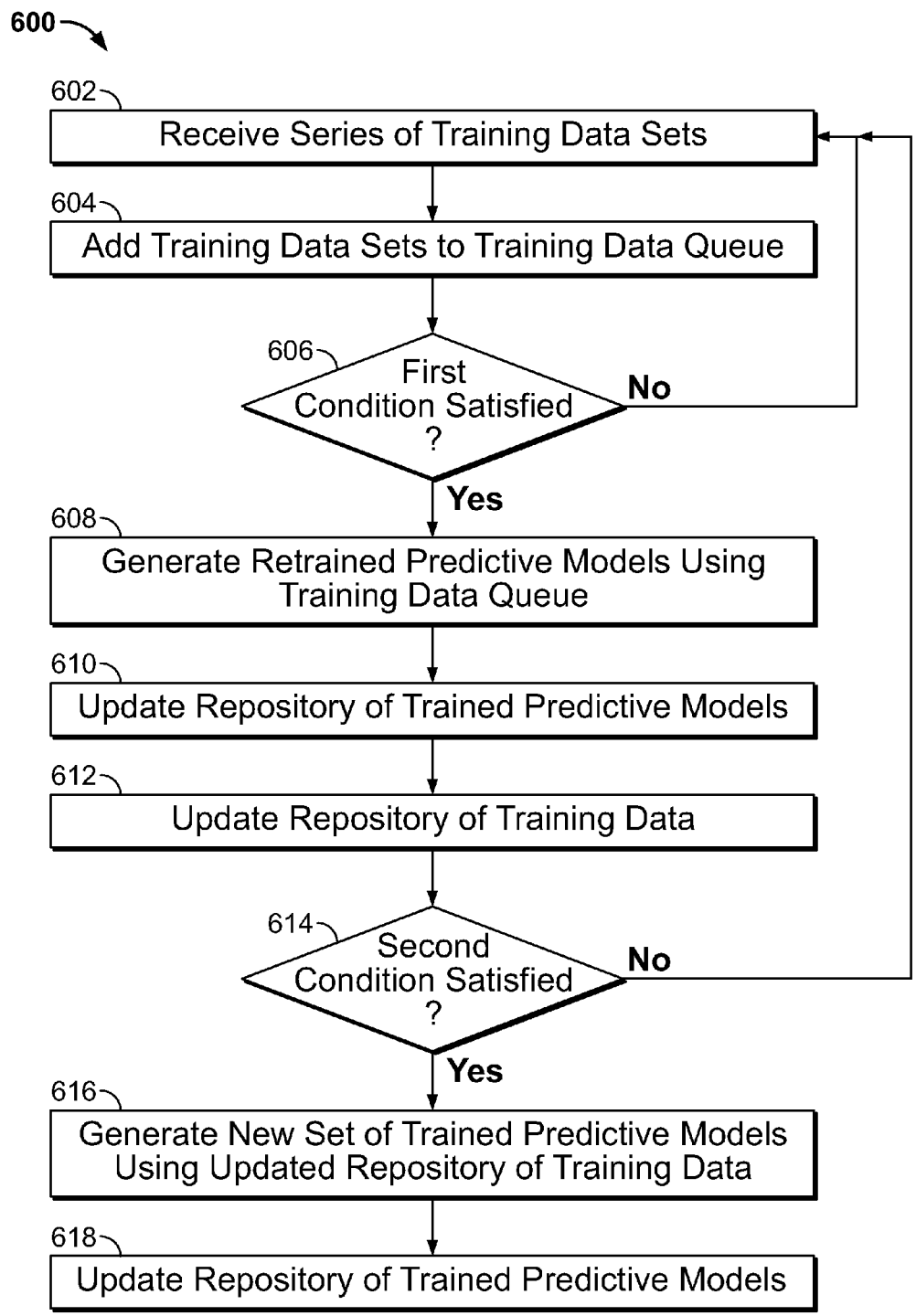
FIG. 6 is a flowchart showing an example process for maintaining an updated dynamic repository of trained predictive models.

FIG. 6 is a flowchart showing an example process 600 for maintaining an updated dynamic repository of trained predictive models. The repository of trained predictive models is dynamic in that new training data can be received and used to update the trained predictive models included in the repository by retraining the updateable trained predictive models and regenerating the static and updateable trained predictive models with updated training data. The dynamic repository can be maintained at a location remote from a computing system that will use one or more of the trained predictive models to generate predictive output. By way of illustrative and non-limiting example, the dynamic repository can be maintained by the dynamic predictive modeling server system 306 shown in FIG. 3 for the client computing system 204a. In other implementations, the computing system can maintain the dynamic repository locally. For the purpose of describing the process 600, reference will be made to the system shown in FIG. 3, although it should be understood that a differently configured system can be used to perform the process (e.g., if the computing system is maintaining the dynamic repository locally).

When this process 600 begins, a set of trained predictive models exists that includes one or more updateable trained predictive models and one or more static trained predictive models that were previously generated from a set of training data stored in the training data repository 314 and a set of training functions stored in the training function repository 316. The set of trained predictive models is stored in the predictive model repository 315. A series of new training data sets are received (Step 602). The sets of training data can be received incrementally (i.e., serially) or together in one or more batches. The training data sets are added to the training data queue 313. New training data can continue to accumulate in the training data queue 313 as new training data sets are received. The training data sets are "new" in that they are new as compared to the training data in the training data repository 314 that was used to train the set of trained predictive models in the predictive model repository 315.

When a first condition is satisfied ("yes" branch of step 606), then an update of updateable trained predictive models stored in the predictive model repository 315 occurs. The first condition that can trigger can update of updateable trained predictive models can be selected to accommodate various considerations. For example, receiving new training data in and of itself can satisfy the condition and trigger the update. In another example, receiving an update request from the client computing system 204a can satisfy the condition. Other examples of first condition include a threshold size of the training data queue 313. That is, once the volume of data in the training data queue 313 reaches a threshold size, the first condition can be satisfied and an update can occur. The threshold size can be defined as a predetermined value, e.g., a certain number of kilobytes of data, or can be defined as a fraction of the training data included in the training data repository 314. That is, once the amount of data in the training data queue is equal to or exceeds x % of the data used to initially train the trained predictive model or x % of the data in the training data repository 314 (which may be the same, but could be different), the threshold size is reached. In another example, once a predetermined time period has expired, the first condition is satisfied. For example, an update can be scheduled to occur once a day, once a week or otherwise. In another example, if the training data is categorized, then when the training data in a particular category included in the new training data reaches a fraction of the initial training data in the particular category, then the first condition can be satisfied. In another example, if the training data can be identified by feature, then when the training data with a particular feature reaches a fraction of the initial training data having the particular feature, the first condition can be satisfied (e.g., widgets X with scarce property Y). In yet another example, if the training data can be identified by regression region, then when the training data within a particular regression region reaches a fraction of the initial training data in the particular regression region (e.g., 10% more in the 0.0 to 0.1 predicted range), then the first condition can be satisfied. The above are illustrative examples, and other first conditions can be used to trigger an update of the updateable trained predictive models stored in the predictive model repository 315.

Until the first condition is satisfied ("no" branch of step 606), training data sets can be continued to be received and added to the training data queue 313. When the first condition is satisfied, an update of the updateable trained predictive models stored in the repository 315 is triggered. The updateable trained predictive models that are stored in the repository 315 are "updated" with the training data stored in the training data queue 313. That is, retrained predictive models are generated (Step 608) using: the training data queue 313; the updateable trained predictive models obtained from the repository 315; and the corresponding training functions that were previously used to train the updateable trained predictive models, which training functions are obtained from the training function repository 316.

The predictive model repository 315 is updated (Step 610). In some implementations, the predictive model repository 315 is updated by adding the retrained predictive models to the trained predictive models already stored in the repository 315, thereby increasing the total number of trained predictive models in the repository 315. In other implementations, each of the trained predictive models in the repository 315 is associated with an effectiveness score and the effectiveness scores of the retrained predictive models are generated. The effectiveness score of each retrained predictive model can be compared to the effectiveness score of the updateable trained predictive model from which it was derived, and the most effective of the two models stored in the repository 315 and the other discarded, thereby maintaining the same total number of trained predictive models in the repository 315. In other implementations, where there is a desire to maintain only n trained predictive models in the repository (where n is an integer greater than 1), the effectiveness scores of the retrained predictive models and the trained predictive models already stored in the repository 315 can be compared and the n most effective trained predictive models stored in the repository 315 and the others discarded. Other techniques can be used to determine which trained predictive models to store in the repository 315 after the updateable trained predictive models have been retrained.

The training data repository 314 is updated (Step 612). In some implementations, the training data stored in the training data queue 313 is added to the training data that is stored in the training data repository 314. The merged set of training data can be the updated training data. In other implementations, a data retention policy can be implemented to determine which training data to retain and which to delete for purposes of updating the training data repository 314, where the data retention policy can define rules governing maintaining and deleting data. For example, the policy can specify a maximum volume of training data to maintain in the training data repository, such that if adding training data from the training data queue 313 will cause the maximum volume to be exceeded, then some of the training data is deleted. The particular training data that is to be deleted can be selected based on the date of receipt (e.g., the oldest data is deleted first), selected randomly, selected sequentially if the training data is ordered in some fashion, based on a property of the training data itself, or otherwise selected. Other techniques can be used to determine which training data from the received series of training data sets is stored in the training data repository 314 and which training data already in the repository 314 is retained.

When a second condition is satisfied ("yes" branch of step 614), then an "update" of all the trained predictive models stored in the predictive model repository 315 occurs, including both the static trained predictive models and the updateable trained predictive models. The second condition that can trigger can update of all the trained predictive models can be selected to accommodate various considerations. For example, receiving an update request from the client computing system 204a can satisfy the condition. Other examples of second condition include a threshold size of the training data queue 313, which can be defined as a predetermined value, e.g., a certain number of kilobytes of data, or can be defined as a fraction of the training data included in the training data repository 314. In another example, once a predetermined time period has expired, the second condition is satisfied. For example, an update can be scheduled to occur once a day, once a week or otherwise. The above are illustrative examples, and other second conditions can be used to trigger an update of all the trained predictive models stored in the predictive model repository 315.

This phase of updating is more accurately described as a phase of "regeneration" rather than updating. That is, the trained predictive models from the repository 315 are not actually updated, but rather a new set of trained predictive models are generated using different training data then was previously used to train the models in the repository 315. The new set of trained predictive models are generated using the updated training data repository 314 and multiple training functions obtained from the training function repository 316 (Step 616). The updated training data repository 314 can include some (or all) of the same training data that was previously used to train the existing set of models in the repository in addition to some (or all) of the received series of training data sets that were received since the last occurrence of the second condition being satisfied.

The predictive model repository is updated (Step 618). In some implementations, the trained predictive models that were stored in the repository 315 before the second condition was satisfied (i.e., before this updating phase began) are discarded and replaced with the new set of trained predictive models. In some implementations, the static trained predictive models that were stored in the repository 315 before the updating phase began are replaced by their counterpart new static trained predictive models. However, the updateable trained predictive models that were stored in the repository 315 before the updating phase are either replaced by their counterpart new trained predictive model or maintained, depending on which of the two is more effective (e.g., based on a comparison of effectiveness scores). In some implementations, only a predetermined number of predictive models are stored in the repository 315, e.g., n (where n is an integer greater than 1), and the trained predictive models with the top n effectiveness scores are selected from among the total available predictive models, i.e., from among the new set of trained predictive models and the trained predictive models that were stored in the repository 315 before the updating phase began. In some implementations, only trained predictive models with an effectiveness score exceeding a predetermined threshold score are stored in the repository 315 and all others are discarded. Other techniques can be used to determine which trained predictive models to store in the repository 315.

Although the process 600 was described in terms of the first condition being satisfied first to trigger an update of only the updateable trained predictive models followed by the second condition being satisfied to trigger an update of all of the trained predictive models, it should be understood that the steps of process 600 do not require the particular order shown. That is, determinations as to whether first condition is satisfied and whether the second condition is satisfied can occur in parallel. In some instances, the second condition can be satisfied to trigger an update of all of the trained predictive models before the first condition has been satisfied. By way of illustrative example, the first condition may require that a threshold volume of new training data accumulate in the training data queue 313. The second condition may require that a certain predetermined period of time has expired. The period of time could expire before the threshold volume of new training data has been received. Accordingly, all of the trained predictive models in the repository 315 may be updated using updated training data, before the updateable trained predictive models were updated with the incremental new training data. Other scenarios are possible, and the above is but one illustrative example.

The above description of FIGS. 3-6 describe an example implementation for generating a predictive model repository, e.g., repository 315 in FIG. 3. The repository was described in the context of a single client computing system 204a that provided initial training data and training data updates that were used to train and retrain the predictive models included in the repository 315. However, it should be understood, as was discussed above, that the dynamic predictive modeling server system 306 can provide services to multiple different client computing systems, and can therefore store many (e.g., hundreds or thousands) of trained predictive models in the predictive model repository 315. In some implementations, one or more client-subscriber computing systems, e.g., client-subscriber computing system 106a, can use a web page (or other mechanism) provided by the dynamic predictive modeling server system 306 to browse a collection of trained predictive models that are available for use by the client-subscriber computing system 106a that were trained using training data provided by a third party (i.e., by a different client computing system, for example the client computing system 204a). In the example system shown, the subscription model repository 104 represents the collection of trained predictive models that are available to client-subscriber computing systems. The subscription model repository 104 is shown separate from the predictive model repository for illustrative purposes, but it can be a subset of the models included in the predictive model repository. The third party that provided the training data would have given permission for the third party's trained model to be included in the collection of trained models that can be browsed. The operator of the client-subscriber computing system 106a can select to license for use (i.e., rent or subscribe to) a trained model from the subscription model repository 104, typically in exchange for a fee.

In some implementations, the predictive modeling server system 306 can provide a marketplace for the trained models, as mentioned above. By way of illustrative example, consider a scenario where the client computing system 204a provides training data that includes records describing credit card holders' payment histories. The predictive modeling server system 306 trains multiple predictive models and selects a most effective trained model using the training data. The client computing system 204a uses the trained model to provide input data that includes the credit card payment history of a credit card holder and a request for an output that predicts whether the credit card holder will default on a next payment. In this example, the client computing system 204a may be owned and operated by a credit card company or a credit rating company. However, a different credit card company or crediting rating company may also have a need for the same type of predictive output from the same type of input data, i.e., the credit card payment history of a credit card holder. The client-subscriber computing system 106a may be such a different credit card company, and this computing system may also use the same trained predictive model to generate predictive outputs, e.g., in exchange for a subscription fee.

In one example, a subscription licensing fee is charged on a pay-per-use basis. In another example, a flat-rate subscription licensing fee is charged for unlimited use for a specified time period. Other fee arrangements are possible, and these are but a couple of examples. Before a trained model from the predictive model repository 315 is included in the subscription model repository 104 and offered for use by client-subscriber computing systems, permission can be sought and granted by the client entity (e.g., the owner of the client computing system 204a) that provided the training data. Security, access control to limit access to the licensees of the trained model, accounting and collection of fees can be implemented using convenient conventional techniques of electronic commerce. Fees generated by licensing the trained models included in the subscription model repository 104 can be paid to the owner of the predictive modeling server system 306, the client entity that provided the training data (e.g., the owner of the client computing system 204a) or otherwise apportioned between the two parties.

In some implementations, the subscription model repository 104 can be maintained and executed by the predictive modeling server system 306, and access to the trained models included in the repository 104 can be provided to the one or more client-subscriber computing systems in the same manner as access is provided to the client computing system 204a. The client-subscriber computing systems provide input data and a request for a predictive output to the trained model for which they have a subscription and receive predictive output in response. The client-subscriber computing systems therefore do not have access to the training data that was provided by the client computing system 204a, and therefore any private information that was used for training remains private.

In other implementations, a third party can operate between the predictive modeling server system 306 and the client-subscriber computing systems, in exchange for some or all of the fees generated by licensing the trained models included in the subscription model repository. For example, the third party can coordinate receiving requests for predictive outputs and the corresponding input data, and providing the predictive outputs in response. The third party may market the various trained models that are available, and handle the ensuing transactions when client-subscriber computing systems pay to use the trained models.

In some implementations, a catalogue of available trained models included in the subscription model repository 104 is provided, which includes descriptions of the type of input data received by each model and the type of predictive output generated in response. The operator of a client-subscriber computing system can decide which trained model to use.

In other implementations, the client-subscriber computing system can provide input data and request for a predictive output of a certain output type to the predictive modeling system, and a trained model is automatically selected from the subscription model repository 104 and used to generate the predictive output. Referring again to FIG. 3, the dynamic predictive modeling server system 306 includes a model matching engine 105. The model matching engine 105 is configured to perform the selection of one or more appropriate trained models from the subscription model repository 104 in response to receiving a request from a client-subscriber computing system.

In some implementations, the model matching engine 105 can query a collection of information that describes each of the trained models included in the subscription model repository 104. For example, the collection of information can be a database that includes an identifier of each model and associated with each identifier a description (or identification) of one or more input types accepted by the model and an output type provided by the model (i.e., the type of predictive output generated by the model in response to receiving the input data of the one or more input types). If a request is received from a would-be client-subscriber computing system for predictive output of a particular type and that describes the type of input the client-subscriber computing system can provide in order to receive the desired predictive output, this information can be used by the model matching engine 105 to query the database of information that describes the subscription model repository 104. The model matching engine 105 can determine there are one or more models that "match" the input type and output type provided by the client-subscriber computing system. In some implementations, descriptions of the one or more matching models can be provided to the client-subscriber, e.g., including approximate accuracy of the models, subscription fees, etc., and the client-subscriber computing system can selected to subscribe to a particular model. In other implementations, the model matching engine 105 can automatically select a best match for the client-subscriber computing system.

In some implementations, the client-subscriber computing system 106a provides either an input data sample, from which the input type or types can be determined by the model matching engine 105, or provides a schematic of the input data, i.e., specifies the input type or types without providing an actual example. The client-subscriber computing system 106a may also provide the desired output type, as discussed above. However, in some instances the client-subscriber computing system 106a may only provide the input type (or sample) without an output type. The model matching engine 105 can query the database of information about the subscription model repository and determine one or more trained models that are compatible with the input type (or types). The model matching engine 105 can provide the client-subscriber computing system 106a with a description of the matching models, including a description of the type of predictive output that is provided by each model. That is, the client-subscriber computing system 106a can find out what types of predictive output can be generated based on the type of input data that the client-subscriber computing system 106a has available to provide to a trained model.

By way of illustrative example, consider a client-subscriber computing system 106a that is operated by an entity that operates a blog that is available over the internet. For a particular blog posting, the entity has the following information available about the blog posting: time posted; author; genre (of blog post). The entity may wish to know the predicted click-through rate (CTR) for a blog post, given specific input data. That is, the entity may seek to determine a predicted CTR for a blog posted at a given time, by a given author of a given genre. In this example, the input data has three components of the following three types: (1) time; (2) author; and (3) genre; and the output type is CTR. Given these types of input and the desired output type, the model matching engine 105 can query the database of information describing the subscription models and determine one or more matching models.

Once a suitable subscription model has been determined and the client-subscriber computing system is subscribed to the model, the client-subscriber computing system can provide a prediction request that includes input data of the input types and in response receive a predictive output of the CTR type. The predictive request engine 108 can be configured to receive the predictive request from the client-subscriber computing system 106a and to provide the received input data to the subscription model. The predictive request engine 108 can provide the predictive output to the client-subscriber computing system 106a that is generated in response to the request.

The model matching engine 105 can be configured to determine a "match" under various circumstances that do not fall without a simple exact match scenario. Some examples are shown below in Table 1 that can be used for illustrative purposes to describe different match scenarios.

TABLE 1

| Example | Client-Subscriber Input Types | Subscription Model Input Types | Subscription Model Output Type | Match Result |
|---------|-------------------------------|--------------------------------|--------------------------------|--------------|
| 1 | a, b, c | a, b, c | X | Perform prediction using input types a, b and c for an exact match. |
| 2 | a, b, c | a, b, c, d | Y | 1. Use Model I with input a, b, and/or c to determine d; 2. Use Model II with inputs a, b, c and d for an exact match |
| 3 | a, b, c | a, b, c, e | Z | Perform prediction without using input type e. |
| 4 | a, b, c, d | a, b, c | X | Perform prediction ignoring input type d. |

In Example (1), the client-subscriber computing system has input types a, b and c. In reference to the example above, input type a can be "time posted", input type b can be "author" and input type c can be "genre". In this example, the particular subscription model that is being compared to the client-subscriber information provides an output type X, e.g., a CTR. The subscription model can generate the output type X upon receiving input types a, b and c. Accordingly, in Example 1 there is an exact match between the client-subscriber's input types and the subscription model's input types. As such, a prediction can be performed using the subscription model and all of the client-subscriber's input data (i.e., of types a, b and c) to generate a predictive output of the type X.

In Example (2), the client-subscriber computing system has input data of types a, b, c and is seeking to receive a predictive output of type Y. For example, rather than click-through rate, the client-subscriber computing system may request an output of "number of comments", i.e., a predicted number of comments that will be posted on a blog's webpage in response to a particular blog posting. A subscription model is available to provide the desired output type Y, however, the subscription model requires four components of input data having types a, b, c and d. The model matching engine 105 can be configured to identify a missing input type to a model that can provide the desired output type, i.e., in this example to identify that input type d is missing from the client-subscriber input. The model matching engine 105 can be further configured to determine if there is a subscription model available that can generate an estimated value having input type d using the available input data of types a, b and/or c. That is, the model matching engine 105 can be configured to identify a "Model I" that is available in the subscription model repository 104 that can receive as input data of types a, b, and/or c (e.g., a, b or c or any combination thereof), and in response generate a predictive output of type d. The predicted output of type d can then be used together with the received input of types a, b and c as input into "Model II". Model II is the subscription model that receives as input, data of types a, b, c and d to generate the predictive output of type Y. Model I is therefore an intermediate model that can be used together with the received input of types a, b and c to estimate the missing input of type d, such that all of the input required for Model II is available and desired predictive output Y can be generated. That is, the model matching engine 105 can be configured to "stack" subscription models to achieve a desired output given a particular input received from a client-subscriber.

In Example (3), the client-subscriber has input of types a, b and c available and wishes to receive a predictive output of type Z, e.g., where Z is advertising revenue that can be generated from a particular blog post. In this example, the modeling matching engine 105 determines that there is a subscription model available that can generate the desired output of type Z, however, the subscription model requires input data of types a, b, c and e. Accordingly, there is a component of input data that is type e that is missing, i.e., not available, from the client-subscriber. In the above example, where input data of type d was missing, the model matching engine 105 was able to identify an intermediate Model I that could be used to estimate an input of type d. However, in this example, the model matching engine 105 is not able to identify such an intermediate model. Accordingly, the model matching engine 105 provides the subscription model that requires input types a, b, c and e, in response to the request. The subscription model can be provided with a warning that the accuracy of the predictive output would be improved with the addition of input data of type e and that in the absence of such input data of type e, the accuracy of the predictive output may be jeopardized. The client-subscriber can determine whether to use the particular model with possibly impaired predictive results, to provide the additional input data of type e requested or to not use the particular model.

In Example (4), the client-subscriber computing system 106a can provide input data of types a, b, c and d and requests a predictive output of type X. The model matching engine 105 determines that a subscription model is available to generate a predictive output of type X in response to receiving input data of types a, b and c. In this example, the model matching engine 105 can present this subscription model as a match and the additional component of input data, i.e., the input data of type d, can be ignored as input to the subscription model, since only input data of types a, b and c are use by the particular subscription model. If there were two subscription models available to provide a predictive output of type X and Model I used input of types a, b, c and d and Model II used input of only types a, b and c, then the model matching engine 105 would identify Model I as the "best match", since more input data is being used, which may increase the accuracy of the predictive output.

The above examples described the model matching engine 105 matching an input received from a client-subscriber computing system of type 'a' to a subscription model input type 'a', that, is, described situations of exact matches between individual input types. In some implementations, the model matching engine 105 is configured to exploit the hierarchy of input types to further identify matches a different hierarchical levels. By way of example, consider an input type of "time" having a hierarchy where "day" is at a highest hierarchical level (e.g., level 3), "hour" is at a second highest hierarchical level (e.g., level 2) and "minute" is at a lowest hierarchical level (e.g., level 1). In this example, with each increment in hierarchical level, there is an decrease in specificity of "time". In the example above where the input data includes "time posted", which refers to a time at which a blog posting is posted, the time can be expressed as a day (e.g., Wednesday) or an hour (e.g., 2 pm) or a minute (e.g., 2:14 pm). Generally, the more specific the input type received from the client-subscriber that is matched to an input type of a subscription model, the more accurate the predictive output, although this may not always be the case. In implementations with input types having hierarchical levels, if the client-subscriber computing system can provide a specific time of day, e.g., 2:14 pm, then the input type can be "time-minute", as compared to the broader "time-hour" and the even more broad "time-day". The identifier "time" can identify a hierarchical category of input types and the identifiers "time-day", "time-hour" and "time-minute" can represent the input types at three different levels in the hierarchical category.

When the model matching engine 105 is attempting to match the input type "time-minute" to an input type found in the database of information describing the subscription models, the model matching engine 105 can first attempt to find an exact match, e.g., an input type in the database of "time-minute". If the attempt to find an exact match fails, then the model matching engine 105 can increment a level in the input type hierarchical category to which the input type belongs, i.e., increment to the "time-hour" level and attempt to find a match. If a match is not found at that hierarchical level, then the level can be incremented again, e.g., to "time-day", which process can be repeated until either a match is found or the highest level in the hierarchy is reached and a match has not been found. In examples where there are multiple input types, e.g., a, b and c, the model matching engine 105 may find exact matches for some input types and have to increment hierarchical levels to find matches for some of the input types in order to successfully find a match for all three input types.

Figure 7:
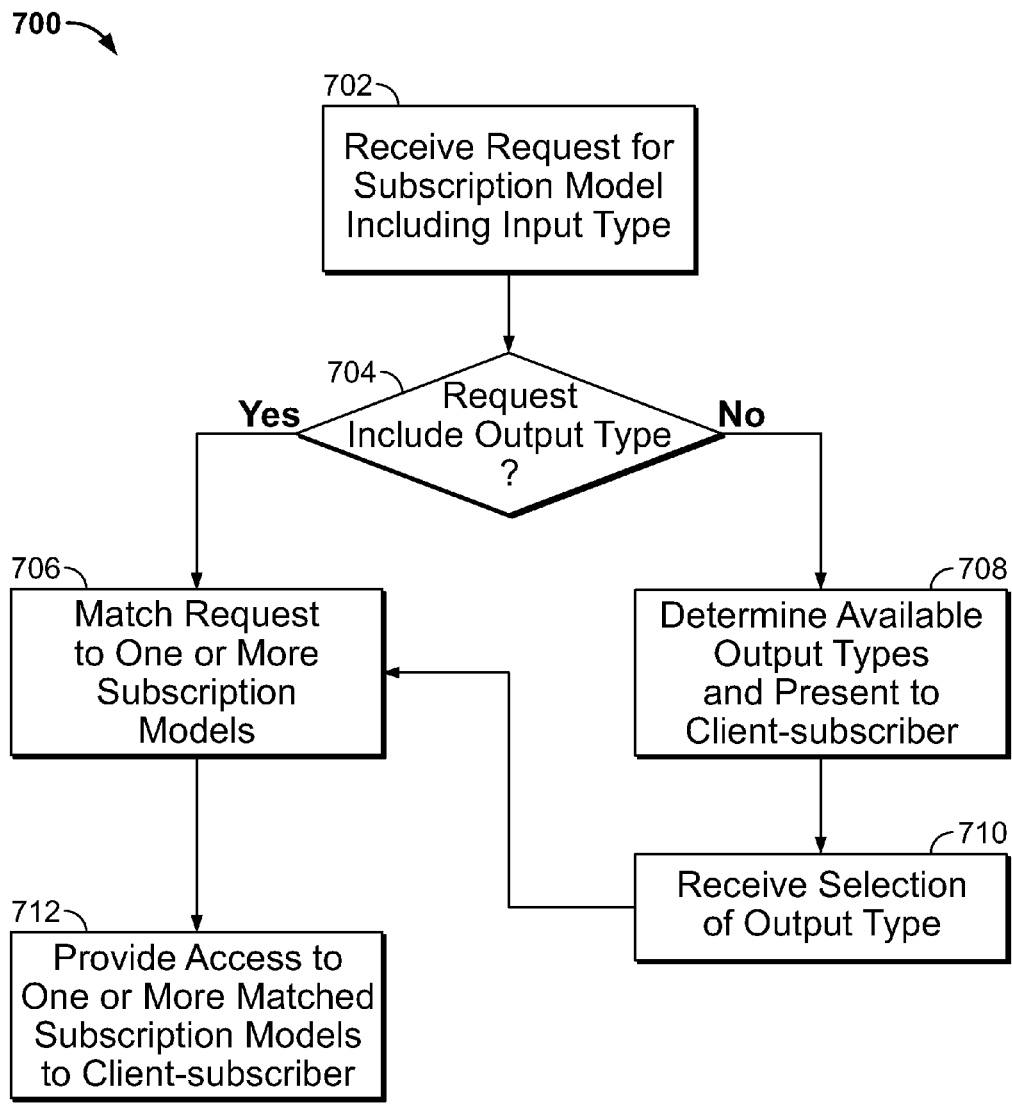
FIG. 7 is a flowchart showing an example process for matching a request to a trained predictive model.

FIG. 7 is a flowchart showing an example process 700 for matching a request to a trained predictive subscription model. By way of illustrative example, the process 700 can be implemented by the predictive modeling server system 306 shown in FIG. 3, and in particular by the model matching engine 105 included therein. However, it should be understood that a differently configured system can be used to implement the process 700.

A request is received for a subscription model that can provide a predictive output to a client-subscriber computing system and the request includes either an input sample from which an input type (or types) can be derived or an identification of the input type (or types) (Step 702). The request can be received by a system that has a collection of trained predictive models available for subscription, e.g., the subscription model repository 104 of the systems of FIG. 1 or FIG. 3. The request may include an output type, i.e., an indication of a particular type of predictive output required in response to input data of the input type (or types) included with the request ("Yes" branch of Step 704). If the output type is indicated, then the information included in the request, i.e., the input type (or types) and the output type are used to determine one or more matching models included in the subscription model repository 104 (Step 706).

If the output type is not indicated ("No" branch of Step 706), then the input type (or types) can be used to determine what types of predictive outputs are available given the input type and the subscription models included in the repository 104 (Step 708). For example, the model matching engine 105 can query the database that describes the trained models included in the repository 104 to find those with input types that match the input type (or types) received from the client-subscriber computing system. The output types that correspond to the matching input types can be then presented to the client-subscriber computing system.

The client-subscriber computing system provides an input indicating a selection of an output type from the output types presented, which input is received by the model matching engine (Step 710). The model matching engine now has the input type (or types) and the desired output type, which can be then used to query the database of information about the subscription models to find one or more matching subscription models (Step 706). As discussed above, in some implementations, a set of "stacked" subscriptions models may be found to collectively provide a match to the input types and the output type. That is, one or more intermediate models may be required to generate estimated input values that can be used together with received input to generate the desired predictive output.

In some implementations, if more than one matching subscription models (or sets of stacked models) are found, the model matching engine 105 can select a best match. In other implementations, descriptions of the multiple matching subscription models can be provided to the client-subscriber computing system and a selection of a particular matching subscription model can be received in response from the client-subscriber computing system. The multiple matching models may be similar in terms of output type, but may have differences, e.g., in terms of accuracy, pricing, run-time, etc.

Access to the selected subscription model (or set of stacked models) can be provided to the client-subscriber computing system (Step 712). In some implementations, providing access to the subscription model includes providing an address to the client-subscriber computing system 106a or other user computing platform that can be used to access the subscription model; for example, the address can be a URL (Universal Resource Locator). Access to the subscription model can be limited to authorized users. For example, a user may be required to enter a user name and password that has been associated with an authorized user before the user can access the subscription model from a computing system, including the client-subscriber computing system 106a. If the client-subscriber computing system 106a desires to access the subscription model to receive a predictive output, the client-subscriber computing system 106a can transmit to the URL a request that includes the input data. The predictive modeling server system 306 receives the input data and prediction request from the client-subscriber computing system 106a. In response, the input data is input to the subscription model and a predictive output is generated by the subscription model and provided to the client-subscriber computing system. In some implementations, the predictive request engine 108 can be configured to receive the input data and prediction request, input same to the subscription model (e.g., obtained from the subscription model repository 104) and to provide the predictive output generated in response to the client-subscriber computing system 106a.

In some implementations, the predictive modeling server system 306 operates independently from the client-subscriber computing system 106a and selects and provides the subscription model to the client computing system 106a as a specialized service. The expenditure of both computing resources and human resources and expertise to train and select a suitable subscription model for the client-subscriber computing system 106a can therefore all occur server-side. Once these selections have been completed, using the subscription model can occur in an automated fashion with little or no human intervention. The client-subscriber computing system 106a thereby benefits from access to a trained predictive model that otherwise might not have been available to the client-subscriber computing system 106a, due to limitations on client-side resources.

In some implementations, as described above in the context of the client computing system 204a (i.e., a client that provides training data), the client computing system is provided with a URL to access a trained predictive model. Similarly, in some implementations, the client-subscriber computing system can be provided with a URL to access the subscription model. In these implementations, input data and a request to the URL (whether from a client computing system or a client-subscriber computing system) can be embedded in an HTML document, e.g., a webpage. In one example, JavaScript can be used to include the request to the URL in the HTML document.

Referring again to the illustrative example above, when a customer is browsing on the client computing system's (or a client-subscriber computing system's) web-based online shopping service, a call to the URL can be embedded in a webpage that is provided to the customer. The input data can be the particular customer's online shopping transaction history. Code included in the webpage can retrieve the input data for the customer, which input data can be packaged into a request that is sent in a request to the URL for a predictive output. In response to the request, the input data is input to the trained predictive model and a predictive output is generated. The predictive output is provided directly to the customer's computer or can be returned to the client computing system or client-subscriber computing system, which can then forward the output to the customer's computer. The client computing system or client-subscriber computing system can use and/or present the predictive output result as desired by the client entity. In this particular example, the predictive output is a prediction of the type of product the customer is most likely to be interested in purchasing. If the predictive output is "blender", then, by way of example, an HTML document executing on the customer's computer may include code that in response to receiving the predictive output cause to display on the customer's computer one or more images and/or descriptions of blenders available for sale on the client (or client-subscriber) computing system's online shopping service. This integration is simple for the client or client-subscriber computing system, because the interaction with the predictive modeling server system can use a standard HTTP protocol, e.g. GET or POST can be used to make a request to a URL that returns a JSON (JavaScript Object Notation) encoded output. The input data also can be provided in JSON format.

The customer using the customer computer can be unaware of these operations, which occur in the background without necessarily requiring any interaction from the customer. Advantageously, the request to the trained predictive model (including a subscription model) can seamlessly be incorporated into the client or client-subscriber computing system's web-based application, in this example an online shopping service. A predictive output can be generated for and received at the client or client-subscriber computing system (which in this example includes the customer's computer), without expending client or client-subscriber computing system resources to generate the output.

In other implementations, the client or client-subscriber computing system can use code (provided by the client or client-subscriber computing system or otherwise) that is configured to make a request to the predictive modeling server system 306 to generate a predictive output using a trained predictive model (including a subscription model). By way of example, the code can be a command line program (e.g., using cURL) or a program written in a compiled language (e.g., C, C++, Java) or an interpreted language (e.g., Python). In some implementations, the subscription model can be made accessible to the client-subscriber computing system or other computer platforms by an API through a hosted development and execution platform, e.g., Google App Engine.

In the implementations described above, the subscription model selected from the repository for a client-subscriber computing system is hosted by the predictive modeling server system 306 and can reside and execute on a computer at a location remote from the client-subscriber computing system 106a. However, in some implementations, once a predictive model has been selected and subscribed to, the client entity may choose to download a copy of the subscription model to the client-subscriber computing system 106a or elsewhere. The client entity may choose to generate and deliver predictive outputs on the client's own computing system or elsewhere. Accordingly, in some implementations, the subscription model is provided to the client-subscriber computing system 106a or elsewhere, and can be used locally by the client entity.

Components of the predictive model server system 102, the client-subscriber computing system 106a, the client computing system 204a and/or the dynamic predictive modeling system 306, e.g., the model matching model 106, the predictive request engine 108, the model training module 312 and the model selection module 310, can be realized by instructions that upon execution cause one or more computers to carry out the operations described above. Such instructions can comprise, for example, interpreted instructions, such as script instructions, e.g., JavaScript or ECMAScript instructions, or executable code, or other instructions stored in a computer readable medium. The components of the client-subscriber computing system 106a, the predictive model server system 102, the client computing system 204a and/or the dynamic predictive modeling system 306 can be implemented in multiple computers distributed over a network, such as a server farm, in one or more locations, or can be implemented in a single computer device.

As discussed above, the dynamic predictive modeling server system 306 can be implemented "in the cloud". The predictive model server system 102 can similarly be implemented in the cloud. In some implementations, the predictive model server system 102 and/or the dynamic predictive modeling server system 306 provide a web-based service. A web page at a URL provided by the predictive model server system 102 and/or the dynamic predictive modeling server system 306 can be accessed by the client-subscriber computing system (e.g., 106a-n) and the client computing system (e.g., 204a). An operator of the client-computing system 204a can follow instructions displayed on the web page to upload training data "to the cloud", i.e., to the predictive modeling server system 306. Once completed, the operator can enter an input to initiate the training and selecting operations to be performed "in the cloud", i.e., by the predictive modeling server system 306, or these operations can be automatically initiated in response to the training data having been uploaded. Similarly, an operator of the client-subscriber computing system 106a can follow instructions displayed on the web page to upload a request for a subscription model, which can include one or more input samples or information that indicates one or more input types and optionally an output type.

The operator of the client computing system 204a can access the one or more trained models that are available to the client computing system 204a from the web page. Similarly, the operator of the client-subscriber computing system 106a can access the one or more subscription models that are subscribed to by the client-subscriber computing system 106a from the web page. In either instance, representations of the available predictive models can be displayed, for example, by names listed in a drop down menu or by icons displayed on the web page, although other representations can be used. The operator can select one of the available predictive models, e.g., by clicking on the name or icon. In response, a second web page (e.g., a form) can be displayed that prompts the operator to upload input data that can be used by the selected trained model (including a subscription model) to provide predictive output data (in some implementations, the form can be part of the first web page described above). For example, an input field can be provided, and the operator can enter the input data into the field. The operator may also be able to select and upload a file (or files) from the client-subscriber computing system 106a or the client computing system 204a to the predictive modeling server system 306 using the form, where the file or files contain the input data. In response, the selected predicted model can generate predictive output based on the input data provided, and provide the predictive output to the client-subscriber computing system 106a or the client computing system 204a either on the same web page or a different web page. The predictive output can be provided by displaying the output, providing an output file or otherwise.

In some implementations, the client-subscriber computing system 106a or the client computing system 204a can grant permission to one or more other client computing systems to access one or more of the available trained predictive models of the client computing system. The web page used by the operator of the client-subscriber computing system 106a or the client computing system 204a to access the one or more available trained predictive models can be used (either directly or indirectly as a link to another web page) by the operator to enter information identifying the one or more other client computing systems being granted access and possibly specifying limits on their accessibility. Conversely, if the client-subscriber computing system 106a or the client computing system 204a has been granted access by a third party (i.e., an entity controlling a different client computing system) to access one or more of the third party's trained models, the operator of the client-subscriber computing system 106a or the client computing system 204a can access the third party's trained models using the web page in the same manner as accessing the client computing system's own trained models (e.g., by selecting from a drop down menu or clicking an icon).

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented system comprising:
   one or more computers;
   one or more data storage devices coupled to the one or more computers, storing:
      a predictive model repository storing a plurality of trained predictive models,
      information that describes each of the trained predictive models, and
      instructions that, when executed by the one or more computers, cause the one or more computers to perform operations comprising:
         receiving a request from a client-subscriber computing system for access to a trained predictive model;
         determining one or more trained predictive models in the predictive model repository that match the request based on the request and the information that describes each of the trained predictive models; and
         providing access to at least one of the one or more models to the client-subscriber computing system;
      wherein the one or more models that match the request are models that were trained using training data provided by a computing system other than the client-subscriber computing system.

2. The system of claim 1, the operations further comprising:
   determining an output type for predictive output for the client-subscriber computing system comprising:
      determining from the information that describes each of the trained predictive models that one or more models included in the predictive model repository are compatible with one or more input types determined from the request to input types and that the one or more models can generate output of one or more output types, and
   selecting the output type from the one or more output types.

3. The system of claim 2, wherein selecting the output type from the one or more output types comprises selecting the output type in response to input received from the client-subscriber computing system that identifies an output type to select.

4. The system of claim 2, wherein selecting the output type from the one or more output types comprises selecting the output type that is associated with a model from the one or more models that is best matched to the request.

5. The system of claim 2, wherein determining from the information that describes each of the trained predictive models that one or more models included in the predictive model repository match the request from the client-subscriber computing system is further based on a comparison of the output type determined for the request to output types included in the information that describes the trained predictive models.

6. The system of claim 5, wherein a first model of the one or more models that are determined to match the request comprises a model that requires less input types to generate a predictive output than a number of input types determined from the request.

7. The system of claim 5, wherein determining from the information that describes each of the trained predictive models that one or more models included in the predictive model repository match the request from the client-subscriber computing system includes determining that a first model that generates the output type determined for the request requires a first input type to generate a predictive output which first input type is not included in the one or more input types determined from the request, the operations further comprising:
   identifying an intermediate model included in the predictive model repository that can be used with at least some of the one or more input types determined from the request to generate a predictive output that is of the first input type;
   wherein the one or more models determined to match the request from the client-subscriber computing system includes a set of models, which set includes the first model and the intermediate model that together match the request.

8. The system of claim 1, wherein one or more input types can be derived from one or more samples of input data included in the request.

9. The system of claim 1, wherein:
   at least one input type determined from the request is included in a hierarchy of input types, wherein the input type can be represented by incrementally broader input types by incrementing to higher levels in the hierarchy; and
   determining a match based at least in part on a comparison of the input type determined from the request to input types included in the information that describes the trained predictive models includes incrementing to one or more higher levels in the hierarchy until an input type that describes a trained predictive model matches the at least one input type determined from the request as represented by incrementally broader input types.

10. A computer-implemented method comprising:
receiving a request from a client-subscriber computing system for access to a trained predictive model;
determining one or more trained predictive models in the predictive model repository that match the request based on the request and the information that describes each of the trained predictive models; and
providing access to at least one of the one or more models to the client-subscriber computing system;
wherein the one or more models that match the request are models that were trained using training data provided by a computing system other than the client-subscriber computing system.

11. The method of claim 10, further comprising:
determining an output type for predictive output for the client-subscriber computing system comprising:
determining the output type comprises determining from the information that describes each of the trained predictive models that one or more models included in the predictive model repository are compatible with the one or more input types determined from the request to input types and that the one or more models can generate output of one or more output types, and selecting the output type from the one or more output types.

12. The method of claim 11, wherein selecting the output type from the one or more output types comprises selecting the output type in response to input received from the client-subscriber computing system that identifies an output type to select.

13. The method of claim 11, wherein selecting the output type from the one or more output types comprises selecting the output type that is associated with a model from the one or more models that is best matched to the request.

14. The method of claim 11, wherein determining from the information that describes each of the trained predictive models that one or more models included in the predictive model repository match the request from the client-subscriber computing system is further based on a comparison of the output type determined for the request to output types included in the information that describes the trained predictive models.

15. The method of claim 14, wherein a first model of the one or more models that are determined to match the request comprises a model that requires less input types to generate a predictive output than a number of input types determined from the request.

16. The method of claim 14, wherein determining from the information that describes each of the trained predictive models that one or more models included in the predictive model repository match the request from the client-subscriber computing system includes determining that a first model that generates the output type determined for the request requires a first input type to generate a predictive output which first input type is not included in the one or more input types determined from the request, the method further comprising:
identifying an intermediate model included in the predictive model repository that can be used with at least some of the one or more input types determined from the request to generate a predictive output that is of the first input type;
wherein the one or more models determined to match the request from the client-subscriber computing system includes a set of models, which set includes the first model and the intermediate model that together match the request.

17. The method of claim 10, wherein one or more input types can be derived from one or more samples of input data included in the request.

18. The method of claim 10, wherein:
at least one input type determined from the request is included in a hierarchy of input types, wherein the input type can be represented by incrementally broader input types by incrementing to higher levels in the hierarchy; and
determining a match based at least in part on a comparison of the input type determined from the request to input types included in the information that describes the trained predictive models includes incrementing to one or more higher levels in the hierarchy until an input type that describes a trained predictive model matches the at least one input type determined from the request as represented by incrementally broader input types.

19. A computer-readable storage device encoded with a computer program product, the computer program product comprising instructions that when executed on one or more computers cause the one or more computers to perform operations comprising:
receiving a request from a client-subscriber computing system for access to a trained predictive model from a repository of trained predictive models;
determining one or more trained predictive models in the predictive model repository that match the request based on the request and the information that describes each of the trained predictive models; and
providing access to at least one of the one or more models to the client-subscriber computing system;
wherein the one or more models that match the request are models that were trained using training data provided by a computing system other than the client-subscriber computing system.

20. The computer-readable storage device of claim 19, the operations further comprising:
determining an output type for predictive output for the client-subscriber computing system comprising:
determining the output type comprises determining from the information that describes each of the trained predictive models that one or more models included in the predictive model repository are compatible with the one or more input types determined from the request to input types and that the one or more models can generate output of one or more output types, and selecting the output type from the one or more output types.

21. The computer-readable storage device of claim 20, wherein selecting the output type from the one or more output types comprises selecting the output type in response to input received from the client-subscriber computing system that identifies an output type to select.

22. The computer-readable storage device of claim 20, wherein selecting the output type from the one or more output types comprises selecting the output type that is associated with a model from the one or more models that is best matched to the request.

23. The computer-readable storage device of claim 20, wherein determining from the information that describes each of the trained predictive models that one or more models included in the predictive model repository match the request from the client-subscriber computing system is further based on a comparison of the output type determined for the request to output types included in the information that describes the trained predictive models.

24. The computer-readable storage device of claim 23, wherein a first model of the one or more models that are determined to match the request comprises a model that requires less input types to generate a predictive output than a number of input types determined from the request.

25. The computer-readable storage device of claim 23, wherein determining from the information that describes each of the trained predictive models that one or more models included in the predictive model repository match the request from the client-subscriber computing system includes determining that a first model that generates the output type determined for the request requires a first input type to generate a predictive output which first input type is not included in the one or more input types determined from the request, the operations further comprising:

identifying an intermediate model included in the predictive model repository that can be used with at least some of the one or more input types determined from the request to generate a predictive output that is of the first input type;

wherein the one or more models determined to match the request from the client-subscriber computing system includes a set of models, which set includes the first model and the intermediate model that together match the request.

26. The computer-readable storage device of claim 19, wherein one or more input types can be derived from one or more samples of input data included in the request.

27. The computer-readable storage device of claim 19, wherein:

at least one input type determined from the request is included in a hierarchy of input types, wherein the input type can be represented by incrementally broader input types by incrementing to higher levels in the hierarchy; and determining a match based at least in part on a comparison of the one or more input types determined from the request to input types included in the information that describes the trained predictive models includes incrementing to one or more higher levels in the hierarchy until an input type that describes a trained predictive model matches the at least one input type determined from the request as represented by incrementally broader input types.

* * * * *